United States Patent Office 3,632,573
Patented Jan. 4, 1972

3,632,573
METHOD FOR PRODUCING BENZODIAZEPINE DERIVATIVES
Hisao Yamamoto and Shigeho Inaba, Nishinomiya-shi, Tadashi Okamoto, Ashiya-shi, Toshiyuki Hirohashi, Kobe, Kikuo Ishizumi, Minoo-shi, Michihiro Yamamoto, Takarazuka-shi, Isamu Maruyama, Minoo-shi, Kazuo Mori, Kobe, and Tsuyoshi Kobayashi, Minoo-shi, Japan, assignors to Sumitomo Chemical Company, Ltd., Osaka, Japan
No Drawing. Filed Apr. 29, 1968, Ser. No. 725,140
Claims priority, application Japan, Oct. 9, 1967, 42/65,102, 42/65,104; Oct. 18, 1967, 42/67,354; Nov. 2, 1967, 42/70,794, 42/70,798; Nov. 6, 1967, 42/71,598; Nov. 8, 1967, 42/72,078; Dec. 9, 1967, 42/79,166; Dec. 15, 1967, 42/80,514; Dec. 21, 1967, 42/82,273
Int. Cl. C07d 53/06
U.S. Cl. 260—239.3
25 Claims

ABSTRACT OF THE DISCLOSURE

Benzodiazepine derivatives, which are known as tranquilizers, represented by the formula:

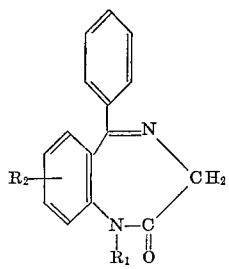

wherein $R_1$ is a cycloalkylmethyl such as cyclopropylmethyl and $R_2$ is hydrogen or a halogen, are produced by reacting a novel 2-aminomethylindole derivative represented by the formula:

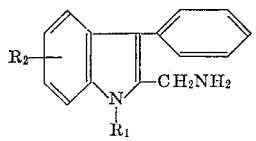

wherein $R_1$ and $R_2$ have the same meanings as defined above, with an oxidizing agent. The said 2-aminomethylindole derivative is produced, for example, by reacting a diazonium salt of an aniline derivative with alkyl α-benzylacetacetate to yield a 2-alkoxycarbonyl-3-phenylindole derivative, cycloalkylmethylating the resultant 2 - alkoxycarbonyl - 3 - phenylindole derivative to yield a corresponding 1-cycloalkylmethyl α-alkoxycarbonyl-3-phenylindole derivative, converting the 2-substituent of an alkoxycarbonyl group to an amido group and then reducing the resultant product to yield the said 2-aminomethylindole derivative.

The present invention relates to a process for preparing benzodiazepine derivatives. More particularly, the invention pertains to a novel process for producing benzodiazepine derivatives represented by the Formula I

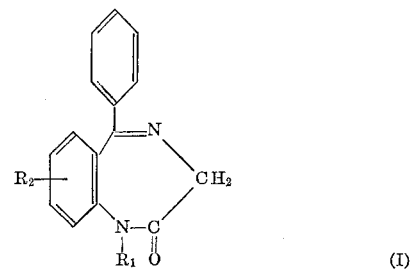

wherein $R_1$ represents a cycloalkylmethyl having 4–7 carbon atoms, and $R_2$ represents a hydrogen atom or halogen atom.

That is, the invention relates to a process, according to which benzodiazepine derivatives represented by the Formula I are readily obtained by reacting 2-aminomethylindole derivatives represented by the Formula II or their salts

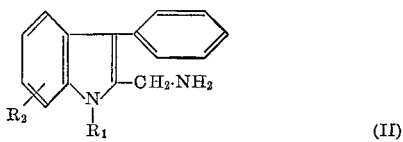

wherein $R_1$ and $R_2$ respectively have the same meanings as defined above, with an appropriate oxidizing agent.

The benzodiazepine derivatives represented by the Formula I are known as remarkably effective tranquilizers, muscle relaxants, anti-convulsants and hypnotics.

A few processes for producing the benzodiazepine derivatives have been described. For instance, which seems to be one of the most useful procedures by now, a benzodiazepine derivative is obtained in a poor yield by reacting a 2-aminobenzophenone derivative with glycine hydrochloride or glycine ethylester (German Patent 1,145,626). For example, crude 7 - chloro-1-methyl-5-phenyl-1,3-dihydro-2H - 1,4 - benzodiazepine-2-one can be prepared in a yield of less than 30% by heating 5-chloro - 2 - methylamino-benzophenone with glycine ethylester hydrochloride.

A benzodiazepine derivative is also prepared by treating a chloroacetamidobenzophenone with ammonia. (Sternbach et al.: Journal of Organic Chemistry 27, 3788 (1962) and German Patent 1,136,709). For example, the reaction of 2 - chloroacetamido-5-chlorobenzophenone with methanolic ammonia produced 7-chloro-5-phenyl-1,3-dihydro-2H-1,4-benzodiazepine-2-one in yield of 33%, which compound has further to be methylated by methyliodide in order to obtain 1-methyl derivative.

Contrary to these procedures, to our astonishment, we have found that a benzodiazepine derivative having the Formula I can be prepared smoothly and economically in high yield and in high purity by reacting a 2-aminomethyl-indole derivative having the Formula II or its salt with an appropriate oxidizing agent. Such surprising process from a 5-membered ring compound to a 7-membered ring compound due to ring expansion reaction has not heretofore been described in any literature. Therefore, the novel process of the present invention is unobvious from the known method of the similar processes, and moreover very much useful and unexpected procedure.

These novel starting materials, 2-aminomethylindole derivatives are prepared easily by the reduction of indole-2-carboxamide derivatives or indole-2-carbonitrile derivatives.

These indole-2-carboxamide derivatives are also novel compounds, which are prepared by the amidation of indole-2-carboxylic acid derivatives in quantitative yield. Further, the indole - 2 - carboxylic acid derivatives are novel, which are obtained, for example, by reacting of benzene diazonium compounds with α-benzyl-β-keto acid ester derivatives.

All of these processes proceed smoothly and give the objective products in high yield, so these procedures are very much useful in practice.

One object of the present invention is to provide a novel process for preparing benzodiazepine derivatives represented by the Formula I.

Another object is to provide a novel process for producing the salts of benzodiazepine derivatives by treating the benzodiazepine derivatives of the Formula I with mineral acid such as hydrochloric acid, sulfuric acid, nitric acid and phosphoric acid, or organic acid such as maleic acid, fumaric acid, succinic acid, formic acid, and acetic acid.

A further object of the present invention is to provide novel indole derivatives and process for preparing the same.

Other objects of the present invention will be apparent from the following description.

In order to accomplish these objects, the present invention provides a process for preparing benzodiazepine derivatives represented by the Formula I, which comprises reacting a 2-aminomethylindole derivative represented by the Formula II or its salt with an oxidizing agent.

Further the present invention provides a process for producing salts of benzodiazepine derivatives of the Formula I, which comprises reacting a 2-aminomethylindole derivative of the Formula II or its salt with an oxidizing agent to yield the benzodiazepine derivative of the Formula I and reacting the said benzodiazepine derivative of the Formula I with mineral acid such as hydrochloric acid, sulfuric acid, nitric acid, phosphoric acid, or organic acid such as maleic acid, fumaric acid, succinic acid, formic acid and acetic acid.

Still further, the present invention provides novel phenylhydrazone derivatives and benzene diazonium derivatives and a process for production thereof.

Furthermore, the present invention provides novel indole derivatives, that is, 2-aminomethylindole derivatives, indole-2-carbonitrile derivatives, indole-2-carboxamide derivatives, indole-2-carboxylic acid derivatives, and a process for production thereof.

In carrying out the process for preparing the benzodiazepine derivatives according to the present invention, 2-aminomethylindole derivatives represented by the Formula II or their salts are reacted with an appropriate oxidizing agent, for example, ozone, hydrogen peroxide, peracid (e.g. performic acid, peracetic acid and perbenzoic acid), chromic acid and potassium permanganate. The oxidizing agent used in the process of the invention is not limited, however, only to those exemplified above. The reaction is generally readily effected at room temperature. Higher or lower temperature is sometimes found more satisfactory.

Chromic acid is preferred as oxidizing agents. The reaction may preferably be carried out in the presence of a solvent. The solvent depends upon the oxidizing agents used, and is selected from water, acetone, carbon tetrachloride, acetic acid, sulfuric acid and any other solvents which do not react substantially with any of the reactants. The oxidizing agent is used in a stoichiometric amount or more. The reaction temperature depends upon the oxidizing agent used.

In case the oxidation is carried out using chromic acid in the presence of acetic acid, it is preferable to use 2–3 times a stoichiometric amount of chromic acid and to conduct the reaction at room temperature. A 2-aminomethylindole derivative or its salt, such as hydrochlorides, hydrobromide, sulfate, nitrate, acetate, and the like is dissolved or suspended in a solvent and an oxidizing agent is added thereto with stirring. The reaction is generally completed within about 24 hours.

The desired benzodiazepine derivative can be separated from the reaction mixture in a crude form by extraction after neutralization or without neutralization and by evaporation to dryness. The product may be further purified, if desired, by recrystallization from an appropriate solvent such as ethanol, isopropanol and the like in a usual manner.

Thus, for example, the invention includes benzodiazepine derivatives such as 1-cyclopropylmethyl-5-phenyl-1,3-dihydro-2H-1,4-benzodiazepine-2-one,
1-cyclopropylmethyl-5-phenyl-6-chloro-1,3-dihydro-2H-1,4-benzodiazepine-2-one,
1-cyclopropylmethyl-5-phenyl-7-chloro-1,3-dihydro-2H-1,4-benzodiazepine-2-one,
1-cyclopentylmethyl-5-phenyl-7-chloro-1,3-dihydro-2H-1,4-benzodiazepine-2-one,
1-cyclopropylmethyl-5-phenyl-8-chloro-1,3-dihydro-2H-1,4-benzodiazepine-2-one,
1-cyclopropylmethyl-5-phenyl-9-chloro-1,3-dihydro-2H-1,4-benzodiazepine-2-one,
1-cyclopropylmethyl-5-phenyl-7-bromo-1,3-dihydro-2H-1,4-benzodiazepine-2-one,
1-cyclobutylmethyl-5-phenyl-7-chloro-1,3-dihydro-2H-1,4-benzodiazepine-2-one,
1-cyclopentylmethyl-5-phenyl-7-bromo-1,3-dihydro-2H-1,4-benzodiazepine-2-one and
1-cyclohexylmethyl-5-phenyl-7-chloro-1,3-dihydro-2H-1,4-benzodiazepine-2-one.

The salts of the present invention may be prepared by reacting the benzodiazepine derivative (I) with the acid in a suitable solvent. The salts may be also separated from the reaction mixture by the usual procedure.

2-aminomethylindole derivatives represented by the Formula II, the starting material in this process, are novel compounds. These compounds are readily produced, for example, by the following process.

The process for producing 2-aminomethylindole derivatives of the Formula II is illustrated as follows.

At the first step for producing the 2-aminomethylindole derivatives (II), a phenylhydrazone derivative represented by the Formula V

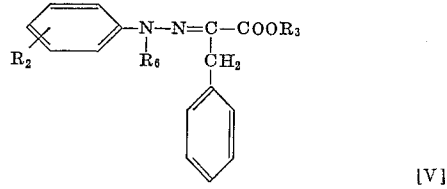

wherein $R_2$ respectively has the same meanings as defined above and $R_3$ represents a hydrogen atom, alkyl having 1–4 carbon atoms or benzyl and $R_6$ is a hydrogen atom or $R_1$, is prepared by reacting a phenylpyruvic acid derivative represented by the Formula III

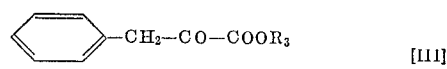

wherein $R_3$ has the same meaning as defined above, with a phenylhydrazine derivative represented by the Formula IV or its salt

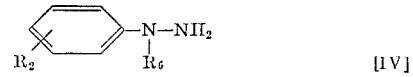

wherein $R_2$ and $R_6$ respectively have the same meanings as defined above.

The reaction is preferably carried out in the presence of an inert solvent such as lower alcohol, e.g. methanol, ethanol and the like. The reaction proceeds at room temperature, although slightly elevated temperature may be employed to increase the rate of reaction.

Thus, for example, the invention includes phenylhydrazone derivatives such as phenylpyruvic acid phenylhydrazone,
phenylpyruvic acid p-chlorophenylhydrazone,
methyl phenylpyruvate p-chlorophenylhydrazone,
ethyl phenylpyruvate p-chlorophenylhydrazone,
tertiary butyl phenylpyruvate p-chlorophenylhydrazone and ethyl phenylpyruvate p-chlorophenylhydrazone.

Further, it is also possible to obtain a phenylhydrazone derivative represented by the Formula V'

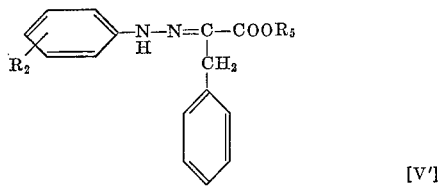

[V']

wherein $R_2$ has the same meaning as defined above and $R_5$ represents an alkyl having 1–4 carbon atoms or benzyl group, by reacting a β-keto acid ester derivative represented by the Formula VII

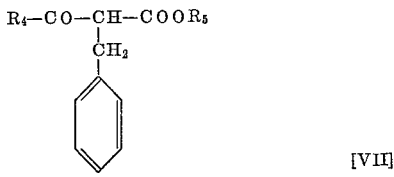

[VII]

wherein $R_4$ represents an alkyl having 1–4 carbon atoms, and $R_5$ has the same meaning as defined above, with a benzene diazonium salt represented by the Formula VIII

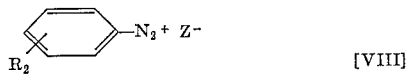

[VIII]

wherein Z represents a halogen atom and $R_2$ has the same meaning as defined above.

In carrying out the process of the present invention, the β-keto acid ester derivative represented by the Formula VII may be allowed to react with the diazonium salt represented by the Formula VIII in the presence of a base, for example, such as sodium hydroxide, potassium hydroxide, sodium methylate and sodium ethylate, in an appropriate solvent, for example, water, methanol and ethanol, whereby the reaction readily proceeds. Because of unstability of the diazonium salt, the reaction is preferably carried out below 10° C.

Thus, for example, the invention includes phenylhydrazone derivatives such as methyl phenylpyruvate p-chlorophenylhydrazone,
ethyl phenylpyruvate p-chlorophenylhydrazone and
tertiary butyl phenylpyruvate p-chlorophenylhydrazone.

At the second step novel indole-2-carboxylic acid derivatives represented by the Formula VI

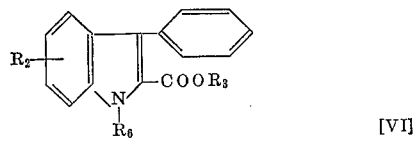

[VI]

wherein $R_2$, $R_3$ and $R_6$ respectively have the same meanings as defined above, are prepared by treating these phenylhydrazone derivatives (V) in a solvent or solvent mixture. As solvents, there may be employed any solvent which is inert to the system as represented lower alkanols such as methanol, ethanol, isopropanol and tertiary butanol, aromatic solvents such as benzene, toluene, xylene, organic acids such as formic acid and acetic acid or other organic solvent such as acetone, chloroform and cyclohexane. The reaction is preferably carried out in the presence of acids; mineral acids such as hydrochloric acid, hydrobromic acid, sulfuric acid, phosphoric acid and polyphosphoric acid, organic acid such as formic acid and acetic acid or other acidic reagents, including Lewis acids such as zinc chloride, iron chloride, aluminum chloride and boron fluoride. The reaction is generally effected at elevated temperature.

Thus, for example, the invention includes indole-2-carboxylic acid derivatives such as, 3-phenyl-5-chloro-indole-2-carboxylic acid,
methyl 3-phenyl-5-chloro-indole-2-carboxylate,
ethyl 3-phenyl-5-chloro-indole-2-carboxylate,
tertiary butyl 3-phenyl-5-chloro-indole-2-carboxylate,
3-phenyl-6 (or 4)-chloro-indole-2-carboxylic acid,
3-phenyl-7-chloro-indole-2-carboxylic acid,
benzyl 3-phenyl-5-chloro-indole-2-carboxylate,
ethyl 1-cyclopropylmethyl-3-phenyl-indole-2-carboxylate,
1-cyclopropylmethyl-3-phenyl-5-chloro-indole-2-carboxylic acid,
methyl 1-cyclopropylmethyl-3-phenyl-5-chloro-indole-2-carboxylate,
ethyl 1-cyclopropylmethyl-3-phenyl-5-chloro-indole-2-carboxylate,
tertiary butyl 1-cyclopropylmethyl-3-phenyl-5-chloro-indole-2-carboxylate,
benzyl 1-cyclopropylmethyl-3-phenyl-5-chloro-indole-2-carboxylate,
ethyl 1-cyclopropylmethyl-3-phenyl-5-bromo-indole-2-carboxylate,
ethyl 1-cyclopropylmethyl-3-phenyl-5-fluoro-indole-2-carboxylate,
methyl 1-cyclopropylmethyl-3-phenyl-6 (or 4)-chloro-indole-2-carboxylate,
ethyl 1-cyclopropylmethyl-3-phenyl-7-chloro-indole-2-carboxylate,
ethyl 1-cyclobutylmethyl-3-phenyl-5-chloro-indole-2-carboxylate,
ethyl 1-cyclopentylmethyl-3-phenyl-5-chloro-indole-2-carboxylate, and
ethyl 1-cyclohexylmethyl-3-phenyl-5-chloro-indole-2-carboxylate, Otherwise, the novel indole-2-carboxylic acid derivatives represented by the Formula VI are readily obtained by reacting the ketone derivatives represented by the Formula III with the phenylhydrazine derivative represented by the Formula IV or its salt. The reaction mentioned above can be carried out in a solvent, for example, alcohols such as methanol, ethanol, isopropanol and tertiary butanol, aromatic hydrocarbon such as benzene, toluene and xylene, organic acid such as formic acid and acetic acid, or other inert organic solvent such as acetone, chloroform and cyclohexane, preferably in the presence of an acid catalyst, for example, mineral acid such as hydrogen chloride, hydrogen bromide, sulfuric acid, phosphoric acid and polyphosphoric acid, organic acid such as formic acid and acetic acid. Lewis acid such as zinc chloride, iron chloride, aluminum chloride and boron fluoride, or cation exchange resin. When a salt of the phenylhydrazine derivative (IV) is used as a starting material, the reaction proceeds even in the absence of the above-mentioned acid catalyst to give the objective indole derivative (VI). As a salt of the phenylhydrazine derivative (IV), following salts are useful: for example, inorganic acid salt such as hydrochloride, hydrobromide and sulfate or organic acid salt such as acetate and oxalate.

The reaction usually proceeds at room temperature, but, if desired, the reaction may be controlled by heating or cooling, though the heating and cooling are not always necessary.

Thus, for example, the invention includes indole derivatives such as, 1-cyclopropylmethyl-3-phenyl-indole-2-carboxylic acid,
ethyl 1-cyclopropylmethyl-3-phenyl-indole-2-carboxylate,
1-cyclopropylmethyl-3-phenyl-5-chloro-indole-2-carboxylic acid,
methyl 1-cyclopropylmethyl-3-phenyl-5-chloro-indole-2-carboxylate,
ethyl 1-cyclopropylmethyl-3-phenyl-5-chloro-indole-2-carboxylate,
tertiary butyl 1-cyclopropylmethyl-3-phenyl-5-chloro-indole-2-carboxylate,
benzyl 1-cyclopropylmethyl-3-phenyl-5-chloro-indole-2-carboxylate,
ethyl 1-cyclopropylmethyl-3-phenyl-5-bromo-indole-2-carboxylate,
methyl 1-cyclopropylmethyl-3-phenyl-6 (or 4)-chloro-indole-2-carboxylate,
ethyl 1-cyclopropylmethyl-3-phenyl-7-chloro-indole-2-carboxylate,
ethyl 1-cyclopropylmethyl-3-phenyl-5-fluoro-indole-2-carboxylate,
ethyl 1-cyclobutylmethyl-3-phenyl-5-chloro-indole-2-carboxylate,
ethyl 1-cyclopentyl-3-phenyl-5-chloro-indole-2-carboxylate,
ethyl 1-cyclohexylmethyl-3-phenyl-5-chloro-indole-2-carboxylate,
methyl 3-phenyl-5-chloro-indole-2-carboxylate and
3-phenyl-5-chloro-indole-2-carboxylic acid.

Further, novel indole-2-carboxylic acid ester derivatives represented by the Formula IX

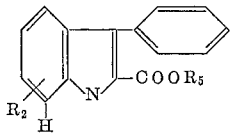

[IX]

wherein $R_2$ and $R_5$ have the same meanings as defined above, is also obtained by treating a β-keto acid ester derivative represented by the Formula VII with a benzene diazonium salt derivative represented by the general Formula VII.

In carrying out this process, the β-keto acid ester derivative represented by the aforesaid Formula VII may be allowed to react with the diazonium salt represented by the aforesaid Formula VIII in the presence of a base, such as sodium hydroxide, potassium hydroxide, sodium methylate and sodium ethylate in an appropriate solvent, such as water, methanol and ethanol, whereby the reaction readily proceeds. Because of unstability of the diazonium salt, it is preferable to carry out the reaction below 10° C., preferably below 5° C. Thereafter, treatment of the reaction product with an acid causes formation of the indole-2-carboxylic acid ester derivative represented by the aforesaid Formula IX. However, an intermediate produced during this reaction is preferably once isolated and treated with an acid in an organic solvent to yield very readily the aimed indole-2-carboxylic acid ester derivative (IX) in good yield. In this reaction, an acid, for example, mineral acid such as hydrogen chloride, hydrogen bromide, sulfuric acid, phosphoric acid and polyphosphoric acid, or other Lewis acid such as zinc chloride, ferrous chloride, aluminum chloride, stannous chloride and boron fluoride is suitable.

In this reaction, following solvents are most useful, for example, alcohols such as methanol, ethanol and isopropanol, aromatic hydrocarbons such as benzene, toluene and xylene, organic acids such as formic acid and acetic acid, or common organic solvents such as acetone, chloroform and cyclohexane.

Thus, for example, the invention includes indole-2-carboxylic acid ester derivatives such as methyl 3-phenyl-5-chloro-indole-2-carboxylate,
ethyl 3-phenyl-5-chloro-indole-2-carboxylate,
tertiary butyl 3-phenyl-5-chloro-indole-2-carboxylate,
benzyl 3-phenyl-5-chloro-indole-2-carboxylate,
ethyl 3-phenyl-6 (or 4)-chloro-indole-2-carboxylate and
ethyl 3-phenyl-7-chloro-indole-2-carboxylate.

Furthermore, it is also possible to obtain a novel azo derivative represented by the general Formula XXII

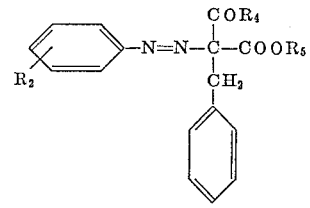

[XXII]

wherein $R_2$, $R_4$ and $R_5$ have the same meanings as mentioned above, by reacting a β-keto acid ester derivative represented by the Formula VII with a benzene diazonium salt derivative represented by the Formula VIII.

The method is the same as that for preparing a phenylhydrazone derivative (V') from β-keto acid derivative (VII) and benzene diazonium salt derivative (VIII) mentioned above except the following point. That is, as a suitable base for this purpose, a weak base such as sodium acetate, potassium acetate, is used instead of a strong base.

Thus, the obtained azo derivative (XXII) can give an indole-2-carboxylic acid ester derivative represented by the Formula IX by the same procedure as an indole-2-carboxylic acid ester derivative is prepared from a phenyl hydrazone derivative mentioned above.

A novel N-cycloalkylmethyl indole-2-carboxylic acid derivative represented by the general Formula X

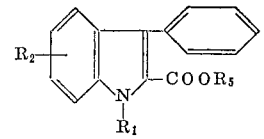

[X]

wherein $R_1$, $R_2$ and $R_5$ have the same meanings as defined above, is obtained by reacting an indole-2-carboxylic acid ester derivative represented by the Formula IX with cycloalkylmethylating agents. The alkylation is carried out by treating an indole-2-carboxylic acid derivative represented by the Formula IX in the presence of an alkaline condensing agent, if necessary, or with an alkaline condensing agent to form an alkaline metal salt thereof, and then treating with a cycloalkylmethylating agent.

As the alkaline condensing agent, following compounds are useful, for example, alkali metal, alkaline earth metal, alkali metal hydride, alkaline earth metal hydride, alkali metal hydroxide, alkaline earth metal hydroxide, alkali metal amide and alkaline earth metal amide.

Cycloalkylmethylation of an indole-2-carboxylic acid ester derivative represented by the Formula IX is carried out by contacting it with following compounds, for example, cycloalkylmethyl halide such as cyclopropyl methyl iodide, cyclopropylmethylchloride, cyclopropylmethylbromide, and cycloalkylmethyl aromatic sulfonate such as cyclopropylmethyl paratoluenesulfonate.

Thus, for example, the invention includes indole-2-carboxylic acid derivatives such as, ethyl 1-cyclopropylmethyl-3-phenyl-indole-2-carboxylate,
methyl 1-cyclopropylmethyl-3-phenyl-5-chloro-indole-2-carboxylate,
ethyl 1-cyclopropylmethyl-3-phenyl-5-chloro-indole-2-carboxylate,
benzyl 1-cyclopropylmethyl-3-phenyl-5-chloro-indole-2-carboxylate,
ethyl 1-cyclopropylmethyl-3-phenyl-5-bromo-indole-2-carboxylate,
ethyl 1-cyclopropylmethyl-3-phenyl-5-fluoro-indole-2-carboxylate,
ethyl 1-cyclobutylmethyl-3-phenyl-5-chloro-indole-2-carboxylate,
ethyl 1-cyclopentylmethyl-3-phenyl-5-chloro-indole-2-carboxylate, and
ethyl 1-cyclohexylmethyl-3-phenyl-5-chloro-indole-2-carboxylate.

Furthermore, an indole-2-carboxylic acid derivative represented by the Formula XI

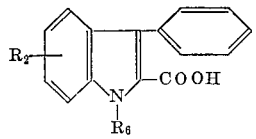

wherein $R_2$ and $R_6$ each has the same meanings as defined above, can be produced by converting an indole-2-carboxylic acid ester derivative represented by the Formula IX or to its corresponding acid.

The indole-2-carboxylic acid ester derivative represented by the aforesaid Formula X is treated in water and/or alcohols such as methanol and ethanol, preferably in the presence of a hydrolyzing agent, to readily give the indole-2-carboxylic acid derivative represented by the Formula XI.

As a hydrolyzing agent, following compounds are useful; for example, mineral acid such as hydrochloric acid and sulfuric acid, alkali metal such as sodium, potassium and lithium, alkali metal hydroxide such as sodium hydroxide and potassium hydroxide, alkali metal carbonate such as sodium carbonate and potassium carbonate, alkaline earth metal hydroxide such as barium hydroxide, and calcium hydroxide, and ammonia compound such as ammonium hydroxide or the like. Alkali metal hydroxide or alkaline earth metal hydroxide is preferred. The reaction can be carried out even at room temperature, preferably at an elevated temperature.

Furthermore, the indole-2-carboxylic acid ester derivative (IX) or can also be hydrolyzed by treating the same in an organic acid such as acetic acid and propionic acid in the presence of a mineral acid.

Alternatively, when $R_5$ is a tertiary butyl group, the indole-2-carboxylic acid ester derivative (IX) or can also be converted to the objective carboxylic acid (XI) by heating the same together with a mineral acid or toluenesulfonic acid. When $R_5$ is a benzyl group, the benzyl group can also be removed by hydrogenosis. The objective substance can be obtained as a metal salt or ammonium salt.

Thus, for example, the invention includes following indole-2-carboxylic acid derivatives such as 3-phenyl-5-chloro-indole-2-carboxylic acid,
3-phenyl-6 (or 4)-chloro-indole-2-carboxylic acid,
3-phenyl-7-chloro-indole-2-carboxylic acid,
1-cyclopropylmethyl-3-phenyl-5-chloro-indole-2-carboxylic acid,
1-cyclopropylmethyl-3-phenyl-5-bromo-indole-2-carboxylic acid,
1-cyclopropylmethyl-3-phenyl-6 (or 4)-chloro-indole-2-carboxylic acid,
1-cyclopropylmethyl-3-phenyl-7-chloro-indole-2-carboxylic acid,
1-cyclopropylmethyl-3-phenyl-indole-2-carboxylic acid,
1-cyclobutylmethyl-3-phenyl-5-chloro-indole-2-carboxylic acid,
1-cyclobutylmethyl-3-phenyl-5-bromo-indole-2-carboxylic acid,
1-cyclopentylmethyl-3-phenyl-5-chloro-indole-2-carboxylic acid and
1-cyclohexylmethyl-3-phenyl-5-chloro-indole-2-carboxylic acid.

At the third step, a novel indole-2-carboxylic acid derivative represented by the Formula XII

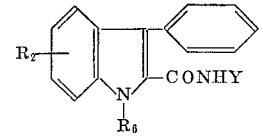

wherein $R_2$ and $R_6$ each has the same meanings as defined above and Y represents a hydrogen atom or hydroxy, can be produced by reacting the indole-2-carboxylic acid derivative (XI) or its reactive derivative, for example, acid halide, ester or the like with ammonia or hydroxylamine. As the reactive derivative, acid halide, ester and acid anhydride are useful.

In this reaction, following acid halides can be used, for example, acid chloride and acid bromide. Following esters can be used, for example, methyl ester, ethyl ester, tertiary butyl ester, benzyl ester or paranitrophenyl ester. Following acid anhydrides can be used, for example, a mixed anhydride which includes mixed anhydrides described in "Organic Reactions," vol. 12, p. 157 (1962), for example, lower aliphatic anhydride, particularly that of acetic acid or an anhydride of carboxylic acid half esters obtained by reacting an acid represented by the Formula XI with methyl chloroformate, ethyl chloroformate, isobutyl chloroformate, alkyl chloroformate, benzyl chloroformate or chloroformic acid paranitrophenyl ester.

In carrying out this process, the indole-2-carboxylic acid derivative represented by the aforesaid Formula XI or its reactive derivative such as acid halide, ester or acid anhydride is allowed to react with ammonia.

In the present reaction, the presence of a solvent is preferable. In the reaction following solvents can be used, for example, alcohols such as methanol, ethanol and organic solvents such as acetone, benzene, toluene, xylene, chlorobenzene and chloroform.

In the present reaction, ammonia can be used by introducing gaseous ammonia to a reaction mixture or adding alcoholic ammonia (such as methanolic ammonia, ethanolic ammonia) or aqueous ammonia to a reaction mixture.

Because the reaction usually proceeds at room temperature, heating or cooling is not always necessary. However, the reaction may be controlled by heating or cooling, if desired.

Furthermore, when the indole-2-carboxylic acid derivative represented by the Formula XI or its reactive derivative is heated with hydroxylamine or its salt in an appropriate solvent, for example, in alcohol, the corresponding hydroxamic acid derivative is obtained.

Thus, for example, the invention includes indole-2-carboxylic acid derivatives (XII) such as 1-cyclopropylmethyl-3-phenyl-5-chloro-indole-2-carboxamide,
1-cyclopropylmethyl-3-phenyl-5-bromo-indole-2-carboxamide,
1-cyclopropylmethyl-3-phenyl-5-fluoro-indole-2-carboxamide,
1-cyclopropylmethyl-3-phenyl-6 (or 4)-chloro-indole-2-carboxamide, 1-cyclopropylmethyl-3-phenyl-7-chloro-indole-2-carboxamide,
1-cyclobutylmethyl-3-phenyl-5-chloro-indole-2-carboxamide,
1-cyclopentylmethyl-3-phenyl-5-chloro-indole-2-carboxamide,
1-cyclohexylmethyl-3-phenyl-5-chloro-indole-2-carboxamide,
1-cyclohexylmethyl-3-phenyl-5-chloro-indole-2-carboxamide,
3-phenyl-5-chloro-indole-2-carboxamide,
3-phenyl-5-bromo-indole-2-carboxamide,
3-phenyl-5-fluoro-indole-2-carboxamide,
3-phenyl-6 (or 4)-chloro-indole-2-carboxamide,
3-phenyl-7-chloro-indole-2-carboxamide and
1-cyclopropylmethyl-3-phenyl-5-chloro-indole-2-hydroxamic acid.

An indole-2-carboxylic halide represented by the Formula XIII

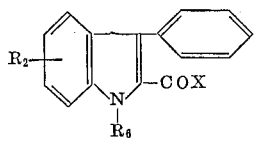

wherein $R_2$ and $R_6$ respectively have the same meanings as defined above and X represents a halogen atom, is obtained by reacting the indole-2-carboxylic acid derivative (XI) with a halogenating agent.

In carrying out this process, the indole-2-carboxylic acid derivative represented by the aforesaid Formula XI is treated together with a halogenating agent in the absence of a solvent or in an inert solvent, such as benzene, toluene, ether, chloroform, methylene chloride and carbon tetrachloride. As the halogenating agent, following compounds are useful; for example, thionyl chloride, phosphorous trichloride, phosphorous tribromide, phosphorous pentachloride, phosphorous oxychloride and phosgene. In this case, the reaction rate is also accelerated by adding a basic substance such as pyridine and dimethylformamide. Furthermore, in this process, a free carboxylic acid can be used as a starting material, but the metal salt, such as sodium salt, may also be used.

After removing the solvent and excess of reacting agents, the reaction product is followed, if necessary, by treatment such as extraction with an inert solvent to give the objective product. In this case, isolation or further purification of this product is not always easy. However, converting the indole-2-carboxylic halide, for example, to indole-2-carboxylic acid amide isolation or purification is not always necessary and crude products or a reaction mixture may be used for the next step.

Thus, for example, the invention includes indole-2-carboxylic acid halide derivatives such as 3-phenyl-indole-2-carboxylic chloride,
1-cyclopropylmethyl-3-phenyl-5-chloro-indole-2-carboxylic chloride,
1-cyclobutylmethyl-3-phenyl-5-chloro-indole-2-carboxylic chloride,
1-cyclopentylmethyl-3-phenyl-5-chloro-indole-2-carboxylic chloride and
1-cyclohexylmethyl-3-phenyl-5-chloro-indole-2-carboxylic chloride.

Furthermore, an indole derivative represented by the Formula XV

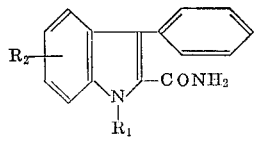

wherein $R_1$ and $R_2$ have the same meanings as defined above, can be obtained by cycloalkylmethylating an amide derivative represented by the general Formula XIV

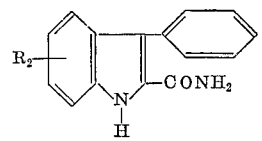

wherein $R_2$ has the same meaning as identified above.

In practising this process, the indole derivatives represented by the aforesaid Formula XIV give their alkaline metal salt by treating the same in the presence of an alkaline condensing agent, and then the resultant alkaline metal salt may be allowed to react with a cycloalkylmethylating agent. As the alkaline condensing agent, following compounds are useful: for example, alkali metal, alkaline earth metal, alkali metal hydride, alkaline earth metal hydride, alkali metal hydroxide, alkali earth metal hydroxide, alkali metal amide and alkaline earth metal amide.

Thus, for example, the invention includes compounds such as 1-cyclopropylmethyl-3-phenyl-5-chloro-indole-2-carboxamide and
1-cyclopropylmethyl-3-phenylindole-2-carboxamide.

At the final step for producing the 2-aminomethylindole derivatives of the Formula II, a novel 2-aminomethylindole derivative represented by the aforesaid Formula II

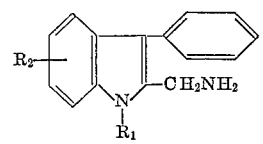

wherein $R_1$ and $R_2$ respectively have the same meanings as defined above, is obtained by converting an indole-2-carboxylic acid derivative represented by the Formula XVI

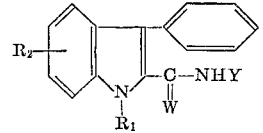

wherein $R_1$ and $R_2$ respectively have the same meanings as defined above and W represents an oxygen or sulfur atom and Y is hydrogen atom or hydroxyl.

In the Formula XVI, when W is a sulfur atom (i.e. indole-2-carboxylic thioamide derivative), the compound (XVI) is produced, for example, by reacting indole-2-carboxylic amide derivative in which W is an oxygen atom with phosphorus pentasulfide.

In practising this process, the reduction of the indole-2-carboxylic derivative represented by the Formula XVI is carried out according to usual method of reduction, such as electrolytic reduction, reduction by alkali metal in alcohols, catalytic reduction in the presence of a catalyst such as a platinum, palladium or nickel catalyst and the like, or reduction with use of metal hydride complex compound. Particularly preferred reduction agent is a metal hydride complex, for example, lithium-aluminum hydride.

The aminomethyl compound (II) obtained by the above process can be converted to the corresponding salt by treating the same with an acid, for example, mineral acid such as hydrochloric acid, hydrobromic acid, sulfuric acid and phosphoric acid.

Thus, for example, the invention includes 2-aminomethyl-indole derivatives such as 1-cyclopropylmethyl-2-aminomethyl-3-phenylindole,
1-cyclopropylmethyl-2-aminomethyl-3-phenyl-5-chloro-indole,
1-cyclopropylmethyl-2-aminomethyl-3-phenyl-5-bromo-indole,
1-cyclopropylmethyl-2-aminomethyl-3-phenyl-6 (or 4)-chloro-indole,
1-cyclopropylmethyl-2-aminomethyl-3-phenyl-7-chloro-indole,
1-cyclobutylmethyl-2-aminomethyl-3-phenyl-5-chloro-indole,
1-cyclopropylmethyl-2-aminomethyl-3-phenyl-5-bromo-indole and
1-cyclopropylmethyl-2-aminomethyl-3-phenyl-5-fluoro-indole and their hydrochlorides, hydrobromides, sulfates, nitrates and phosphates.

Alternatively, the 2-aminomethyl indoles represented by the Formula II can also be prepared in good yield by heating the corresponding amide derivatives XVIII to the corresponding carbonitrile derivatives XIX and reducing the said carbonitrile derivatives.

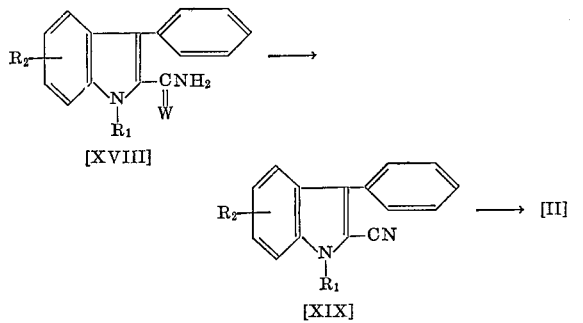

wherein $R_1$, $R_2$ and W respectively have the same meanings as defined above. More particularly, by dehydrating an indole-2-carboxylic acid amide derivative represented by the Formula XVIII, an indole-2-carbonitrile derivative XIX is obtained.

In practising this process, an indole-2-carboxylic amide derivative represented by the aforesaid Formula XVIII is heated, preferably in the presence of a dehydrating agent to give an indole-2-carbonitrile derivative XIX. As the dehydrating agent, following compounds are useful: for example, phosphorous halide such as phosphorous oxychloride, phosphorous trichloride and phosphorous pentachloride or acid chloride such as p-toluenesulfonyl chloride, methylsulfonyl chloride, acetyl chloride, thionyl chloride, benzoyl chloride and carbobenzoxy chloride in the presence or absence of an inert solvent.

Thus, for example, the invention includes indole-2-carbonitrile derivatives such as 1-cyclopropylmethyl-3-phenyl-indole-2-carbonitrile,
1-cyclopropylmethyl-3-phenyl-5-chloro-indole-2-carbonitrile,
1-cyclobutylmethyl-3-phenyl-5-chloro-indole-2-carbonitrile,
1-cyclopentylmethyl-3-phenyl-5-chloro-indole-2-carbonitrile and
1-cyclohexylmethyl-3-phenyl-5-chloro-indole-2-carbonitrile.

Further, by reducing an indole-2-carbonitrile derivative represented by the Formula XIX, a 2-aminomethyl indole derivative represented by the aforesaid Formula II can readily be obtained. More particularly, reduction of the indole-2-carbonitrile derivative represented by the aforesaid general Formula XIX may be carried out by a usual method, for example, electrolytic reduction, reduction by alkali metal in alcohol, catalytic reduction by palladium, nickel or platinum, reduction by chromous acetate-alkali, or reduction by metal hydride complex. Particularly, reduction by metal hydride complex, for example, lithium aluminum hydride, boron hydride, a mixed hydride, is commercially useful from points of simplicity and selectivity.

The 2-aminomethyl-indole derivative II can be converted to the corresponding salt by treating with, for example, mineral acid such as hydrochloric acid, hydrobromic acid, sulfuric acid, phosphoric acid or organic acid such as acetic acid.

Thus, for example, the invention includes 1-cyclopropylmethyl-2-aminomethyl-3-phenyl-indole,
1-cyclopropylmethyl-2-aminomethyl-3-phenyl-5-chloro-indole,
1-cyclobutylmethyl-2-aminomethyl-3-phenyl-5-chloro-indole,
1-cyclopentylmethyl-2-aminomethyl-3-phenyl-5-chloro-indole and
1-cyclohexylmethyl-2-aminomethyl-3-phenyl-5-chloro-indole and their hydrochlorides, hydrobromides, sulfates, phosphates and acetates.

Otherwise the novel N-cycloalkylmethyl-indole-2-carbonitrile derivatives represented by the above-mentioned Formula XIX are obtained by cycloalkylmethylation of an indole-2-carbonitrile derivative represented by the Formula XX

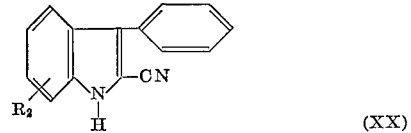

wherein $R_2$ has the same meaning as defined above.

The indole-2-carbonitrile derivative XX is prepared from a compound of the Formula XVIII

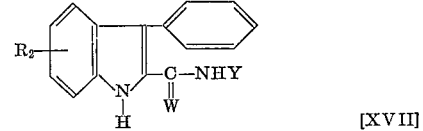

by a method similar to that of a carbonitrile XIX from an amide derivative XVIII.

In practising the present process, the indole-2-carbonitrile derivative represented by the aforesaid Formula XX is treated with cycloalkylmethylating agent, if necessary, in the presence of an alkaline condensing agent, or after formation of alkali metal salts by treating with an alkaline condensing agent to yield the 1-cycloalkylmethyl indole-2-carbonitrile derivative XIX. As the cycloalkylmethylating agent, the following compounds are useful: for example, cycloalkylmethyl halide, cycloalkylmethyl-sulfuric ester or aromatic sulfonic cycloalkylmethylester. As the alkaline condensing agent, the following compounds are useful: for example, alkali metal, alkaline earth metal, alkali metal hydride, alkaline earth metal hydride, alkali metal hydroxide, alkaline earth metal hydroxide, alkali metal amide and alkaline earth metal amide.

The following examples also are illustrative of the methods by which the products of this invention can be prepared and are not to be considered as limiting the invention to the particular procedural conditions employed or to the particular compounds prepared thereby.

EXAMPLE 1

To a solution of 22.5 g. of phenylpyruvic acid in 500 ml. of ethanol, was added 20 g. of p-chlorophenylhydrazine, and the reaction mixture was heated for 30 minutes. After completion of the reaction, the solvent was removed by distillation to give an oily p-chlorophenylhydrazone of phenylpyruvic acid almost quantitatively.

Infrared adsorption spectrum, $$\nu_{max.}^{paraffin} \ 1710 \ cm.^{-1} \ (carbonyl)$$

EXAMPLE 2

According to the similar procedure to that of Example 1, there was obtained an oily phenylpyruvic acid phenylhydrazone from phenylhydrazine and phenylpyruvic acid.

The following phenylhydrazone derivatives were obtained by the procedure of Example 1.

Methyl phenylpyruvate p-chlorophenylhydrazone,
Ethyl phenylpyruvate p-chlorophenylhydrazone,
Tertiary butyl phenylpyruvate p-chlorophenylhydrazone,
Ethyl phenylpyruvate p-chlorophenylhydrazone and
Ethyl phenylpyruvate $N^1$-cyclopropylmethylphenylhydrazone.

EXAMPLE 3

Into a solution of 27.1 g. of ethyl phenylpyruvate p-chlorophenylhydrazone in 30 ml. of ethanol, anhydrous hydrogen chloride gas was introduced, and the reaction mixture was then allowed to stand at room temperature for two hours. The resultant precipitate was collected by filtration, and washed with water, and recrystallized from ethanol to give 19.8 g. of ethyl 3-phenyl-5-chloro-indole-2-carboxylate.

Melting point 172°–172.5° C.

Elementary analysis (for $C_{17}H_{15}O_2NCl$).—Calculated (percent): C, 67.89; N, 4.66; Cl, 11.79. Found (percent): C, 68.10; N, 4.67; Cl, 11.71.

EXAMPLE 4

A mixture of 131 g. of p-chloroaniline, 255 ml. of conc. hydrochloric acid and 250 ml. of water was heated into a solution, and then was cooled below 0° C. To the mixture was added dropwise 222 g. of a 32.3% aqueous solution of sodium nitrite at a temperature below 10° C. with stirring, and then 115 g. of sodium acetate was added to the mixture. The resultant mixture was added, in portionwise, to a chilled mixture of 220 g. of ethyl α-benzylacetoacetate, 1000 ml. of methanol and 200 g. of anhydrous potassium acetate at a temperature below 10° C. with stirring.

After addition, the reaction mixture was stirred for 2 hours at a temperature below 10° C. The precipitate was collected by filtration, washed with water thoroughly, washed with methanol and dried to give 343 g. ethyl α-benzyl-α-(p-chloro-phenyl-azo) acetoacetate. Recrystallization from ethanol gave pure product having a melting point of 61°–62.5° C.

The following compounds are similarly prepared:

Ethyl α-benzyl-α-(phenyl-azo) acetoacetate,
Methyl α-benzyl-α-(p-chloro-phenyl-azo) acetoacetate,
Tert.butyl α-benzyl-α-(p-chloro-phenyl-azo) acetoacetate,
Ethyl α-benzyl-α-(p-bromo-phenyl-azo) acetoacetate, and
Ethyl α-benzyl-α-(m-chloro-phenyl-azo) acetoacetate.

EXAMPLE 5

To an ice-cold solution of 10.8 g. of ethyl α-benzyl-α-(p-chloro-phenyl-azo)-acetoacetate in 15 ml. of ethanol, was added dropwise, a solution of 2.0 g. of potassium hydroxide in 3 ml. of water.

To a reaction mixture, was added 7 ml. of water and the precipitate was collected by filtration, washed with ethanol, and then petroleum ether, and dried to give 7.9 g. of ethyl phenylpyruvate p-chlorophenylhydrazone, M.P. 87°–93° C. Recrystallization from ethanol raised the melting point to 92°–94° C.

EXAMPLE 6

To a suspension of ethyl 180 g. of α-benyl-α-(p-chlorophenyl-azo) acetoacetate in 500 ml. of isopropanol, was added dropwise 50 ml. of concentrated sulfuric acid. The mixture was heated under refluxing for 2.5 hours, and then cooled. The precipitate was collected by filtration, washed with isopropanol, and enough water, and dried to yield 114 g. of ethyl 5-chloro-3-phenyl-indole-2-carboxylate. Recrystallization from ethanol gave pure product having M.P. 178°–180° C.

The following compounds were similarly prepared:

Methyl 3-phenyl-5-chloro-indole-2-carboxylate,
Ethyl 3-phenyl-5-chloro-indole-2-carboxylate,
Tertiary butyl 3-phenyl-5-chloro-indole-2-carboxylate,
Benzyl 3-phenyl-5-chloro-indole-2-carboxylate,
Ethyl 1-cyclopropylmethyl-3-phenyl-indole-2-carboxylate,
Methyl 1-cyclopropylmethyl-3-phenyl-5-chloro-indole-2-carboxylate,
Ethyl 1-cyclopropylmethyl-3-phenyl-5-chloro-indole-2-carboxylate,
Tertiary butyl 1-cyclopropylmethyl-3-phenyl-5-chloro-indole-2-carboxylate,
Benzyl 1-cyclopropylmethyl-3-phenyl-5-chloro-indole-2-carboxylate,
Ethyl 1-cyclopropylmethyl-3-phenyl-5-bromo-indole-2-carboxylate,
Ethyl 1-cyclopropylmethyl-3-phenyl-5-fluoro-indole-2-carboxylate,
Methyl 1-cyclopropylmethyl-3-phenyl-6 (or 4)-chloro-indole-2-carboxylate,
Ethyl 1-cyclopropylmethyl-3-phenyl-7-chloro-indole-2-carboxylate,
Ethyl 1-cyclobutylmethyl-3-phenyl-5-chloro-indole-2-carboxylate,
Ethyl 1-cyclopentylmethyl-3-phenyl-5-chloro-indole-2-carboxylate, and
Ethyl 1-cyclohexylmethyl-3-phenyl-5-chloro-indole-2-carboxylate.

EXAMPLE 7

A mixture of 9.3 g. of ethyl phenylpyruvate $N^1$-(cyclopropylmethyl)-$N^1$-(p-chlorophenyl) hydrazone and 60 ml. of acetic acid was heated at about 80° C. for 1 hour on a steam bath. The reaction mixture was poured into ice-water and insoluble matter was extracted with benzene. The benzene layer was dried over anhydrous sodium sulfate and was concentrated to dryness to yield a crude ethyl 1-cyclopropylmethyl-3-phenyl-5-chloro-indole-2-carboxylate.

EXAMPLE 8

A mixture of 14.4 g. of ethyl phenylpyruvate, 7.5 g. of zinc chloride and 11.6 g. of $N^1$-(cyclopropylmethyl)-$N^1$-(p-chlorophenyl) hydrazine hydrochloride was heated at about 80° C. for 2 hours on a steam bath. The solvent was removed by distillation under reduced pressure, and the residue was washed with water and extracted with benzene The extract was dried over anhydrous sodium sulfate and concentrated to dryness to give ethyl 1-cyclopropylmethyl-3-phenyl-5-chloro-indole-2-carboxylate.

EXAMPLE 9

A mixture of 28.8 g. of ethyl phenylpyruvate, 17.9 g. of p-chlorophenylhydrazine and 100 ml. of acetic acid was heated at 70°–80° C. for 2 hours on a steam-bath.

The reaction mixture was poured into ice-water, and the precipitate was collected by filtration, washed with water and dried to give ethyl 3-phenyl-5-chloro-indole-2-carboxylate.

Recrystallization from ethanol gave needles having melting point of 172°–172.5°° C.

Elementary analysis (for $C_{17}H_{15}O_2NCl$).— Calculated (percent): C, 67.89; N, 4.66; Cl, 11.79. Found (percent): C, 68.01; N, 4.68; Cl, 11.69.

EXAMPLE 10

A mixture of 17.9 g. of p-chlorophenylhydrazine hydrochloride, 100 ml. of acetic acid and 24.6 g. of phenylpyruvic acid was treated according to the similar procedure to that of Example 9 to obtain 3-phenyl-5-chloro-indole-2-carboxylic acid.

Recrystallization from benzene gave a pure product having M.P. 231° C.

Elementary analysis (for $C_{15}H_{11}O_2NCl$).—Calculated (percent): C, 66.07; N, 5.14; Cl, 13.00. Found (percent): C, 66.27; N, 5.21; Cl, 12.92.

The following compounds were similarly prepared:

1-cyclopropylmethyl-3-phenyl-indole-2-carboxylic acid,
Ethyl 1-cyclopropylmethyl-3-phenyl-indole-2-carboxylate,
1-cyclopropylmethyl-3-phenyl-5-chloro-indole-2-carboxylic acid,
Methyl 1-cyclopropylmethyl-3-phenyl-5-chloro-indole-2-carboxylate,
Ethyl 1-cyclopropylmethyl-3-phenyl-5-chloro-indole-2-carboxlate,
Tertiary butyl 1-cyclopropylmethyl-3-phenyl-5-chloro-indole-2-carboxylate,
Benzyl 1-cyclopropylmethyl-3-phenyl-5-chloro-indole-2-carboxylate,
Ethyl 1-cyclopropylmethyl-3-phenyl-5-bromo-indole-2-carboxylate,
Methyl 1-cyclopropylmethyl-3-phenyl-6 (or 4)-chloro-indole-2-carboxylate,
Ethyl 1-cyclopropylmethyl-3-phenyl-7-chloro-indole-2-carboxylate,
Ethyl 1-cyclopropylmethyl-3-phenyl-5-fluoro-indole-2-carboxylate,
Ethyl 1-cyclobutylmethyl-3-phenyl-5-chloro-indole-2-carboxylate,
Ethyl 1-cyclopentylmethyl-3-phenyl-5-chloro-indole-2-carboxylate,
Ethyl 1-cyclohexylmethyl-3-phenyl-5-chloro-indole-2-carboxylate,
Methyl 3-phenyl-5-chloro-indole-2-carboxylate and
3-phenyl-5-chloro-indole-2-carboxylic acid.

EXAMPLE 11

To a solution of 176 g. of ethyl α-benzylacetoacetate in 820 ml. of ethanol, was added 276 ml. of a 50% aqueous potassium hydroxide solution and 1630 ml. of ice-water to produce a solution.

To the solution was added dropwise an ice-cold diazonium salt solution prepared from 104 g. of p-chloroaniline in 325 ml. of conc. hydrochloric acid, and 325 ml. of water and a solution of 56.3 g. of sodium nitrite in 163 ml. of water, and the resulting solution was stirred for 5 minutes.

The reaction mixture was extracted with ether, and the ether layer was dried over sodium sulfate, and the ether was removed by distillation to give 271 g. of p-chlorophenylhydrazone of ethyl phenylpyruvate as an oily substance.

Infrared absorption spectrum:

$$\nu_{\text{max.}}^{\text{paraffin}} \; 1710 \; \text{cm.}^{-1} \; (\text{carbonyl})$$

EXAMPLE 12

To a solution of 176 g. of ethyl α-benzylacetoacetate in 820 ml. of ethanol, was added 276 ml. of a 50% aqueous potassium hydroxide solution under cooling, and was further added 1630 ml. of ice-water.

To this solution, was added an ice-cold diazonium salt solution prepared by mixing 104 g. of p-chloroaniline in 325 ml. of conc. hydrochloric acid, 325 ml. of water and a solution of 56.3 g. of sodium nitrite in 163 ml. of water, and the resultant solution was stirred for 5 minutes.

The reaction mixture was extracted with ether, and the ether layer was dried over sodium sulfate and the ether was then removed by distillation. The resultant oily ether due was dissolved in 300 ml. of ethanol and anhydrous hydrogen chloride gas was introduced to the solution until precipitates were formed. After allowing to stand at room temperature for 2 hours, the precipitates were collected by filtration, washed with water and was recrystallized from ethanol to give 19.6 g. of ethyl 3-phenyl-5-chloro-indole-2-carboxylate having M.P. 172°–172.5° C. as needles.

Elementary analysis (for $C_{17}H_{15}O_2NCl$).—Calculated (percent): C, 67.89; N, 4.66; Cl, 11.79. Found (percent): C, 68.22; N, 4.67; Cl, 11.68.

EXAMPLE 13

To a mixture of 16.0 g. of ethyl 3-phenyl-5-chloro-indole-2-carboxylate, 160 cc. of toluene and 160 cc. of dimethylformamide, was added 3.0 g. of 50% sodium hydride. After stirring at room temperature for 2 hours, 8.0 g. of cyclopropylmethyl bromide was added, and was heated at 110° C. for 3 hours with stirring. The reaction mixture was poured into 400 cc. of ice-water, the organic layer was separated, and further the water layer was extracted with 150 cc. of ether. The combined ether layer was washed with saline water, then dried over sodium sulfate, and the solvent was removed by distillation under reduced pressure. The oily residue (19.4 g.) was dissolved in 20 cc. of chloroform and was charged with 50 cc. of petroleum ether to give crystals. The crystals were collected by filtration and was washed with petroleum ether and dried to give 15.2 g. of ethyl-cyclopropylmethyl-3-phenyl-5-chloro-indole-2-carboxylate. Yield: 81%.

Recrystallization from ethanol gave crystalline product having M.P. 113°–116° C.

The following compounds are similarly prepared:

Ethyl 1-cyclopropylmethyl-3-phenyl-indole-2-carboxylate
Methyl 1-cyclopropylmethyl-3-phenyl-5-chloro-indole-2-carboxylate,
Ethyl 1-cyclopropylmethyl-3-phenyl-5-chloro-indole-2-carboxylate,
Benzyl 1-cyclopropylmethyl-3-phenyl-5-chloro-indole-2-carboxylate,
Ethyl 1-cyclopropylmethyl-3-phenyl-5-bromo-indole-2-carboxylate,
Ethyl 1-cyclopropylmethyl-3-phenyl-5-fluoro-indole-2-carboxylate,
Ethyl 1-cyclopropylmethyl-3-phenyl-5-chloro-indole-carboxylate,
Ethyl 1-cyclobutylmethyl-3-phenyl-5-chloro-indole-2-carboxylate,
Ethyl 1-cyclophentylmethyl-3-phenyl-5-chloro-indole-2-carboxylate, and
Ethyl 1-cyclohexylmethyl-3-phenyl-5-chloro-indole-2-carboxylate.

EXAMPLE 14

A mixture of 82 g. of ethyl 5-chloro-3-phenyl-indole-2-carboxylate and 1.2 l. of a 2.7% potassium hydroxide ethanol solution was heated under refluxing for 2 hours. The ethanol was removed by distillation and the residue was dissolved in 300 ml. of water. The solution was made acidic with conc. hydrochloric acid under cooling. The precipitate formed was collected by filtration, washed thoroughly with water and dried to give 72 g. of 5-chloro-3-phenyl-indole-2-carboxylic acid having melting point of 227°–228° C.

Recrystallization from benzene raised the melting point to 231° C.

EXAMPLE 15

A mixture of 2.0 g. of ethyl 1-cyclopropylmethyl-3-phenyl-5-chloro-indole-2-carboxylate, 0.62 g. of potassium hydroxide and 400 cc. of 95% ethanol was heated under refluxing for 2 hours. After the solvent was removed by distillation under reduced pressure, the residue was dissolved in water and the solution was made acidic with hydrochloric acid to form precipitate. The precipitate was collected by filtration, washed with water and dried to give 1.7 g. of 1-cyclopropylmethyl-3-phenyl-5-chloro-indole-2-carboxylic acid. The melting point was 195°–196° C. Recrystallization from benzene raised the melting point to 197°–198° C.

The following compounds were obtained by a procedure mentioned above.

3-phenyl-6 (or 4)-chloro-indole-2-carboxylic acid,
3-phenyl-7-chloro-indole-2-carboxylic acid,
1-cyclopropylmethyl-3-phenyl-5-bromo-indole-2-carboxylic acid,
1-cyclopropylmethyl-3-phenyl-6 (or 4)-chloro-indole-2-carboxylic acid,
1-cyclopropylmethyl-3-phenyl-7-chloro-indole-2-carboxylic acid,
1-cyclopropylmethyl-3-phenyl-indole-2-carboxylic acid,
1-cyclobutylmethyl-3-phenyl-5-chloro-indole-2-carboxylic acid,
1-cyclobutylmethyl-3-phenyl-5-bromo-indole-2-carboxylic acid,
1-cyclopentylmethyl-3-phenyl-5-chloro-indole-2-carboxylic acid, and
1-cyclohexylmethyl-3-phenyl-5-chloro-indole-2-carboxylic acid.

EXAMPLE 16

1.6 g. of thionyl chloride was added to a suspension of 1.5 g. of 1-cyclopropylmethyl-3-phenyl-5-chloro-indole-2-carboxylic acid in 30 cc. of benzene. The mixture was heated under refluxing for 8 hours, and the benzene and excess thionyl chloride were remoxed by distilation under reduced pressure to give 1.6 g. of an oily residue. The oily residue was dissolved in 30 cc. of anhydrous ether and gaseous ammonia was introduced to the solutiton for 20 minutes under cooling and stirring to give a precipitate. The white precipitate was collected by filtration and washed with water to give 1-cyclopropyl-methyl-3-phenyl-5-chloro-indole-2-carboxamide. There crystallization from benzene gave a pure product having a melting point of 187°–188° C.

EXAMPLE 17

A mixture of 13 g. 3-phenyl-5-chloro-indole-2-carboxylic acid, 250 ml. of dry ether and 15 g. of thionyl chloride was stirred for 4 hours at room temperature. Thereafter, a small amountt of a precipitate was removed by filtration, gaseous ammonia was introduced into the filtrate under ice-cooling. The reaction mixture was allowed to stand in a refrigerator for 2 hours. The resultant precipitate was collected by filtration, washed with water and dried to give 3-phenyl-5-chloro-indole-2-carboxamide. Recrystallization from benzene gave crystals having a melting point of 215°–216.5° C.

EXAMPLE 18

A mixture of 60 g. of 3-phenyl-5-chloro-indole-2-carboxylic acid, 1.2 l. of anhydrous benzene and 150 g. of thionyl chloride was heated and refluxed for 3 hours. After completion of the reaction, the solvent was removed by distillation under reduced pressure to give almost quantitatively 64.2 g. of 3-phenyl-5-chloro-indole-2-carboxylic acid chloride.

Gaseous ammonia was introduced to a solution of 64.2 g. of 3-phenyl-5-chloro-indole-2-carboxylic acid chloride in 1.5 l. of dry ether under ice-cooling, and the mixture was allowed to stand for 1 hr. The reaction mixture was concentrated to give crystals, which were collected by filtration, washed with water and dried to give 58 g. of 3-phenyl-5-chloro-indole-2-carboxamide, M.P. 217°–219° C.

EXAMPLE 19

The following compounds were obtained according to the similar procedure to that of Example 16.

1-cyclopropylmethyl-3-phenyl-5-bromo-indole-2-carboxamide,
1-cyclopropylmethyl-3-phenyl-5-fluoro-indole-2-carboxamide,
1-cyclopropylmethyl-3-phenyl-6 (or 4)-chloro-indole-2-carboxamide,
1-cyclopropylmethyl-3-phenyl-7-chloro-indole-2-carboxamide,
1-cyclobutylmethyl-3-phenyl-5-chloro-indole-2-carboxamide,
1-cyclopentylmethyl-3-phenyl-5-chloro-indole-2-carboxamide,
1-cyclohexylmethyl-3-phenyl-5-chloro-indole-2-carboxamide,
1-cyclohexylmethyl-3-phenyl-5-chloro-indole-2-carboxamide,
3-phenyl-5-bromo-indole-2-carboxamide,
3-phenyl-5-fluoro-indole-2-carboxamide,
3-phenyl-6 (or 4)-chloro-indole-2carboxamide,
3-phenyl-7-chloro-indole-2-carboxamide and
1-cyclopropylmethyl-3-phenyl-5-chloro-indole-2-hydroxamic acid.

EXAMPLE 20

A mixture of 60 g. of 3-phenyl-5-chloro-indole-2-carboxylic acid, 1.2 l. of anhydrous benzene and 150 ml. of thionyl chloride was heated under refluxing for 3 hours. The solution was evaporated under reduced pressure to dryness to give 64.2 g. of 3-phenyl-5-chloro-indole-2-carboxylic acid chloride (quantitatively).

The product was also confirmed by the following process. In 1.5 l. of dry ether, was dissolved 64.2 g. of the crude 3 - phenyl-5-chloro-indole-2-carboxylic chloride. Gaseous ammonia was introduced to the mixture under ice-cooling. The reaction mixture was concentrated under reduced pressure and cooled. The precipitate was collected by filtration and dried to give 58 g. (almost quantitative) of 3-phenyl-5-chloro-indole-2-carboxamide, M.P. 217°–219° C.

EXAMPLE 21

To a suspension of 4.1 g. of 1 - cyclopropylmethyl-3-phenyl - 5 - chloro-indole-2-carboxylic acid in 60 ml. of benzene, was added 4.5 g. of thionyl chloride, and the mixture was heated. After refluxing for 9 hours and a half, the benzene and excess thionyl chloride were removed by distillation under reduced pressure to give 4.3 g. of 1 - cyclopropylmethyl - 3-phenyl-5-chloro-indole-2-carboxylic chloride as an oily substance.

The product was confirmed by the following process. To the solution mixture of 80 ml. of dry ether and this crude 1 - cyclopropylmethyl-3-phenyl-5-chloro-indole-2-carboxylic chloride, was introduced gaseous ammonia under cooling. The precipitate was collected by filtration, washed with water and dried to give 3.1 g. (78%) of 1-cyclopropylmethyl - 3 - phenyl-5-chloro-indole-2-carboxamide, M.P. 185°–186.5° C. The recrystallization from benzene gave white needles having a melting point of 187°–187.5° C.

The following compounds were similarly prepared:

1-cyclopropylmethyl-3-phenyl-5-chloro-indole-2-carboxylic chloride,
1-cyclobutylmethyl-3-phenyl-5-chloro-indole-2-carboxylic chloride,
1-cyclopentylmethyl-3-phenyl-5-chloro-indole-2-carboxylic chloride and
1-cyclohexylmethyl-3-phenyl-5-chloro-indole-2-carboxylic chloride.

EXAMPLE 22

To a solution of 1.95 g. of 5-chloro-3-phenyl-indole-2-carboxamide in 20 ml. of toluene and 20 ml. of dimethylformamide, was added 0.38 g. of a 50% sodium hydride solution. The mixture was stirred at room temperature for 2 hours and then 1.0 g. of cyclopropylmethylbromide was added to the mixture. The resulting mixture was heated under refluxing for 3 hours. The cooled reaction mixture was poured into ice-water, and extracted with ether. The organic layer was washed with saline water and allowed to stand in a refrigerator over night. The precipitate deposited was collected by filtration, washed with cold ether and dried to give 0.7 g. of 5-chloro-1-cyclopropylmethyl-3-phenyl-indole-2-carboxamide. Recrystallization from ethanol gave crystals having a melting point of 187°–189° C.

1-cyclopropylmethyl - 3 - phenyl-indole-2-carboxamide was similarly prepared.

EXAMPLE 23

To a suspension of 1.6 g. of lithium-aluminum hydride in 300 cc. of dry ether, was added 3.0 g. of 1-cyclopropylmethyl-3-phenyl-5-chloro-indole - 2 - carboxamide with stirring. The mixture was refluxed for 4 hours. After completion of the reaction, the reaction mixture was cooled, and water added dropwise to the mixture to decompose excess lithium-aluminum hydride. The ether layer was concentrated to a residue, which was dissolved in a small amount of ethanol, and 20 cc. of 38% ethanolic hydrochloric acid was added. The mixture was concentrated and allowed to stand in a cool place to give a precipitate. The precipitate was collected by filtration and dried to give 1 - cyclopropylmethyl-2-aminomethyl-3-phenyl-5-chloro-indole hydrochloride.

Recrystallization from ethanol gave crystals having a melting point of 218°–219.5° C.

The following compounds were similarly prepared:

1-cyclopropylmethyl-2-aminomethyl-3-phenylindole,
1-cyclopropylmethyl-2-aminomethyl-3-phenyl-5-chloro-indole,
1-cyclopropylmethyl-2-aminomethyl-3-phenyl-5-bromo-indole,
1-cyclopropylmethyl-2-aminomethyl-3-phenyl-6 (or 4)-chloro-indole,
1-cyclopropylmethyl-2-aminomethyl-3-phenyl-7-chloro-indole,
1-cyclobutylmethyl-2-aminomethyl-3-phenyl-5-chloro-indole,
1-cyclopropylmethyl-2-aminomethyl-3-phenyl-5-bromo-indole, and
1-cyclopropylmethyl-2-aminomethyl-3-phenyl-5-fluoro-indole.

EXAMPLE 24

A mixture of 9.0 g. of 3-phenyl-5-chloro-indole-2-carboxamide and 44.5 g. of phosphorous oxychloride was heated under reflux for 15 minutes. The ice-cold reaction mixture was filtered, washed with ice-water and dried to give 7 g. of 5-chloro-3-phenyl-indole-2-carbonitrile, M.P. 212°–214° C. The filtrate was poured into ice-water and the resulting precipitate was collected by filtration, washed with water and dried to give 1.1 g. of additional 5-chloro-3-phenyl-indole-2-carbonitrile, M.P. 200°–202.5° C.

The following compounds were similarly prepared:

3-phenyl-indole-2-carbonitrile,
3-phenyl-5-chloro-indole-2-carbonitrile,
3-phenyl-5-bromo-indole-2-carbonitrile,
3-phenyl-5-fluoro-indole-2-carbonitrile,
3-phenyl-6 (or 4)-chloro-indole-2-carbonitrile,
3-phenyl-7-chloro-indole-2-carbonitrile,
1-cyclopropylmethyl-3-phenyl-indole-2-carbonitrile,
1-cyclopropylmethyl-3-phenyl-5-chloro-indole-2-corbonitrile,
1-cyclopropylmethyl-3-phenyl-5-chloro-indole-2-carbonitrile,
1-cyclobutylmethyl-3-phenyl-5-chloro-indole-2-carbonitrile,
1-cyclopentylmethyl-3-phenyl-5-chloro-indole-2-carbonitrile, and
1-cyclohexylmethyl-3-phenyl-5-chloro-indole-2-carbonitrile.

EXAMPLE 25

To a suspension of 2 g. of lithium-aluminum hydride in 300 ml. of dry ether, was added dropwise 3.52 g. of 1 cyclopropylmethyl 3-phenyl-5-chloro-indole-2-carbonitrile with stirring. After addition, the mixture was refluxed for 4 hours. After completion of the reaction, the reaction mixture was cooled with ice, water was added dropwise to the mixture with stirring to decompose excess lithium-aluminum hydride. The ether layer was separated, dried with sodium sulfate and then the solvent was removed by distillation under reduced pressure to give 3.3 g. of 1 - cyclopropylmethyl-2-aminomethyl-3-phenyl-5-chloroindole.

To a solution of 1-cyclopropylmethyl-2-amino-methyl-3-phenyl-5-chloroindole in ether, was added 10% hydrochloric acid and the mixture was shaken. The precipitate was collected by filtration to give 1-cyclo-propylmethyl-2-aminomethyl-3-phenyl-5-chloro-indole hydrochloride. Recrystallization from ethanol gave crystals having a melting point of 218°–220° C. (decomposition).

The following compounds are similarly prepared:

1-cyclopropylmethyl-2-aminoethyl-3-phenyl-indole,
1-cyclobutylmethyl-2-aminomethyl-3-phenyl-5-chloro-indole,
1-cyclopentylmethyl-2-aminomethyl-3-phenyl-5-chloro-indole,
1-cyclohexylmethyl-2-aminomethyl-3-phenyl-5-chloro-indole, and these hydrochlorides, hydrobromides, sulfates, phosphates and acetates.

EXAMPLE 26

To a solution of 0.69 g. of 1-cyclopropylmethyl-2-aminoethyl-3-phenyl-5-chloroindole in 10 ml. of acetic acid, was added 1 ml. of an aqueous solution containing 1.0 g. of chromic anhydride under cooling. The reaction mixture was exothermic. After stirring at room temperature for 15 hours, the reaction mixture was poured into 10 cc. of water, cooled and was made alkaline with 28% aqueous ammonia. The resultant solution was extracted with chloroform and chloroform layer was dried over sodium sulfate. The solvent was removed by distillation and the residue was dissolved in 0.5 cc. of ethanol under heating. Then the solution was allowed to stand at room temperature, and the precipitate filtered and dried to give 1-cyclopropylmethyl-5-phenyl-7-chloro-1,3 - dihydro - 2·H - 1,4-benzodiazepine-2-one. Recrystallization from ethanol gave crystals having a melting point of 143°–145° C.

EXAMPLE 27

To a mixture of 3 g. of 1-cyclopropylmethyl-2-aminomethyl-3-phenyl-5-chloroindole and 30 ml. of acetic acid, was added a solution of 3 g. of chromic anhydride in 3 ml. of water under cooling. Stirring was continued overnight at room temperature. The reaction mixture was poured into 150 ml. of water, made alkaline with aqueous ammonia and extracted with chloroform. The chloroform layer was dried over sodium sulfate, and distilled under reduced pressure to a residue, to which was added a small amount of ethanol to give crystals of 1-cyclopropylmethyl-5-phenyl-7-chloro-1,3-dihydro - 2H - 1,4 - benzodiazepine-2-one. Recrystallization from methanol gave crystals having a melting point, 142°–143° C.

The following compounds were similarly prepared:

1-cyclopropylmethyl-5-phenyl-1,3 -dihydro-2H-1,4-benzodiazepine-2-one, 1-cyclopropylmethyl-5-phenyl-6-chloro-1,3-dihydro-2H-1,4-benzodiazepine-2-one,
1-cyclopentylmethyl-5-phenyl-7-chloro-1,3-dihydro-2H-1,4-benzodiazepine-2-one,
1-cyclopropylmethyl-5-phenyl-8-chloro-1,3-dihydro-2H-1,4-benzodiazepine-2-one,
1-cyclopropylmethyl-5-phenyl-9-chloro-1,3-dihydro-2H-1,4-benzodiazepine-2-one,
1-cyclopropylmethyl-5-phenyl-7-bromo-1,3-dihydro-2H-1,4-benzodiazepine-2-one,
1-cyclobutylmethyl-5-phenyl-7-chloro-1,3-dihydro-2H-1,4-benzodiazepine-2-one,
1-cyclopenthylmethyl-5-phenyl-7-bromo-1,3-dihydro-2H-1,4-benzodiazepine-2-one, and
1-cyclohexylmethyl-5-phenyl-7-chloro-1,3-dihydro-2H-1,4-benzodiazepine-2-one.

EXAMPLE 28

To a solution of 1-cyclopropylmethyl - 2 - aminomethyl-3-phenyl-5-chloroindole in acetic acid was added a mixture of 1.0 g. of chromic acid an 1 ml. of water. Thereafter, the mixture was stirred overnight. Thereto was added 1 ml. of water, and the mixture was neutralized with aqueous ammonia and extracted with chloroform. The chloroform layer was concentrated to a resinous substance, which was solidified with ethanol. The crystals were filtered to give 0.26 g. of 1-cyclopropylmethyl-5-phenyl-7-chloro-1,3-dihydro-2H-1,4-benzodiazepine-2-one. M.P. 138°–141° C. Recrystallization from ethanol gave crystals having melting point of 143°–144° C.

We claim:
1. A process for preparing benzodiazepines represented by the formula,

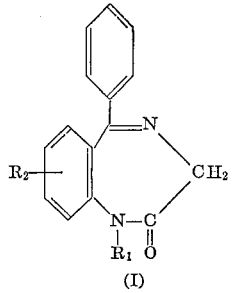

(I)

wherein $R_1$ is a cycloalkylmethyl having 4 to 7 carbon atoms, and $R_2$ is hydrogen or a halogen, which comprises reacting 2-amino-methyl indoles represented by the formula,

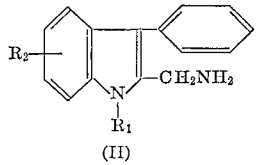

(II)

wherein $R_1$ and $R_2$ respectively have the same meanings as defined above, or their acid addition salts with at least the stoichiometric amount of an oxidizing agent selected from the group consisting of ozone, hydrogen peroxide, peracids, chromic acid and potassium permanganate.

2. Process according to claim 1 wherein said peracids are selected from the group consisting of performic, peracetic and perbenzoic.

3. Process according to claim 1 wherein said acid addition salts are hydrochloric, sulfuric, nitric, phosphoric, maleic, fumaric, succinic, formic or acetic acid addition salts.

4. Process according to claim 1 wherein said oxidizing acid is chromic acid.

5. Process according to claim 4 wherein said oxidation is carried out using chromic acid in the presence of acetic acid and said chromic acid is used in an amount at least 2 to 3 times the stoichiometric amount required.

6. A process for preparing benzodiazepine derivatives represented by the formula,

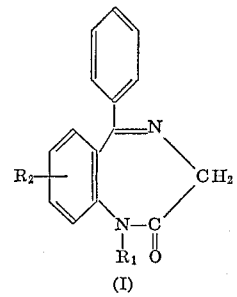

(I)

wherein $R_1$ is a cycloalkylmethyl having 4 to 7 carbon atoms, and $R_2$ is hydrogen or a halogen, which comprises reducing indole-2-carbonitrile derivatives represented by the formula,

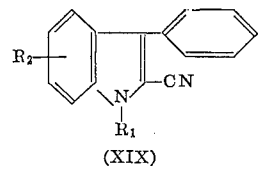

(XIX)

wherein $R_1$ and $R_2$ respectively have the same meanings as defined above, to yield 2-aminomethyl indole derivatives represented by the formula,

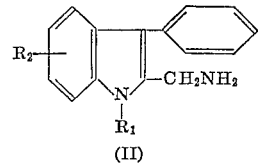

(II)

wherein $R_1$ and $R_2$ respectively have the same meanings as defined above, and then reacting the resultant 2-aminomethyl indole derivatives of the Formula II or their salts with oxidizing agents.

7. A process for preparing benzodiazepine derivatives represented by the formula,

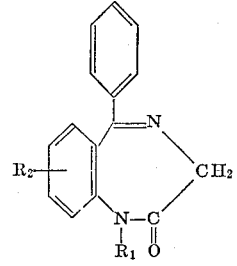

(I)

wherein $R_1$ is a cycloalkylmethyl having 4 to 7 carbon atoms, and $R_2$ is hydrogen or a halogen, which comprises heating indole-2-carboxylic acid amide derivatives represented by the formula,

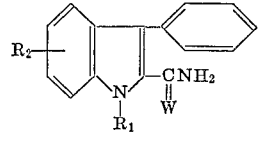

(XVIII)

wherein $R_1$ and $R_2$ respectively have the same meanings as defined above and W is oxygen or sulfur, to yield indole-2-carbonitrile derivatives represented by the formula,

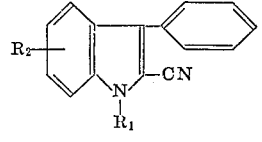

(XIX)

wherein $R_1$ and $R_2$ respectively have the same meanings as defined above, reducing the resultant indole-2-carbonitrile derivatives to yield 2-aminomethyl indole derivatives represented by the formula,

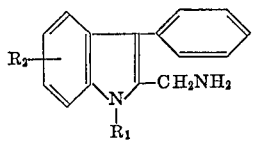

(II)

wherein $R_1$ and $R_2$ respectively have the same meanings as defined above, and then reacting the resultant 2-aminomethyl indole derivatives of the Formula II or their salts with oxidizing agents.

8. A process for preparing benzodiazepine derivatives represented by the formula,

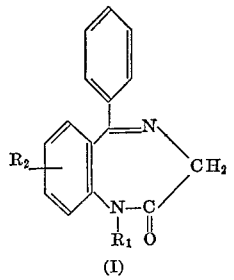

(I)

wherein $R_1$ is a cycloalkyl methyl having 4 to 7 carbon atoms and $R_2$ is a hydrogen atom or a halogen atom, which comprises reacting indole-2-carboxylic acid derivatives represented by the formula,

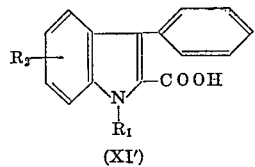

(XI')

wherein $R_1$ and $R_2$ respectively have the same meanings as defined above or their reactive derivatives with ammonia, further, if necessary, reacting a resultant compound with phosphorous pentasulfide to yield indole derivatives represented by the formula

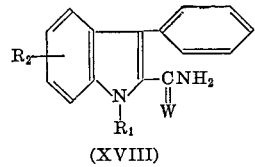

(XVIII)

wherein $R_1$ and $R_2$ respectively have the same meanings as defined above and W is oxygen or sulfur, heating the resultant indole derivatives of the Formula (XVIII) to yield indole-2-carbonitrile derivatives represented by the formula,

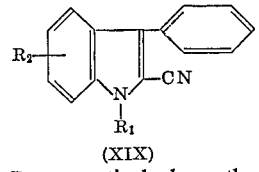

(XIX)

wherein $R_1$ and $R_2$ respectively have the same meanings as defined above, reducing the resultant indole-2-carbonitrile derivatives of the Formula (XIX) to 2-aminomethyl indole derivatives represented by the formula,

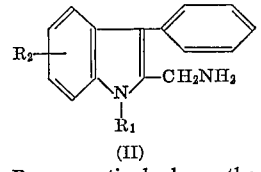

(II)

wherein $R_1$ and $R_2$ respectively have the same meanings as defined above, and then reacting the resultant 2-aminomethyl indole derivatives of the Formula (II) or their salts with oxidizing agents to yield benzodiazepine derivatives of the Formula (I).

9. A process for preparing benzodiazepine derivatives represented by the formula,

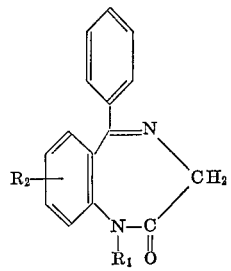

(I)

wherein $R_1$ is a cycloalkylmethyl having 4 to 7 carbon atoms, and $R_2$ is hydrogen or a halogen, which comprises reacting indole-2-carboxylic acid derivatives represented by the formula,

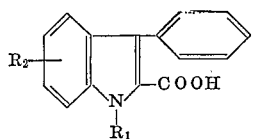

(XI)

wherein $R_1$ and $R_2$ respectively have the same meanings as defined above, with halogenating agents to yield indole-2-carboxylic halide derivatives represented by the formula,

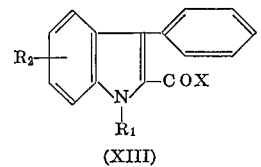

(XIII)

wherein $R_1$ and $R_2$ respectively have the same meanings as defined above and X is a halogen, reacting the resultant indole-2-carboxylic acid halide derivatives with ammonia and further, if necessary, reacting the resultant compounds with phosphorus pentasulfide to yield indole-2-carboxylic acid amide derivatives represented by the formula,

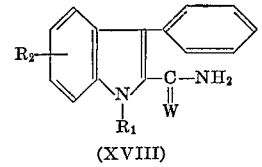

(XVIII)

wherein $R_1$ and $R_2$ respectively have the same meanings as defined above, and W is oxygen or sulfur, heating the resultant indole-2-carboxylic acid amide derivatives of the Formula XVIII to yield indole-2-carbonitrile derivatives represented by the formula,

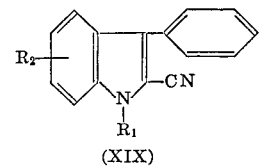

(XIX)

wherein $R_1$ and $R_2$ respectively have the same meanings as defined above, reducing the resultant indole-2-carbonitrile derivatives of the Formula XIX to yield 2-aminomethyl indole derivatives represented by the formula,

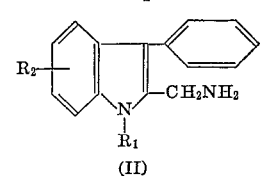

(II)

wherein $R_1$ and $R_2$ respectively have the same meanings as defined above, and reacting the resultant 2-aminomethyl indole derivatives of the Formula II or their salts with oxidizing agents to yield the benzodiazepine derivatives of the Formula I.

10. A process for preparing benzodiazepine derivatives represented by the formula,

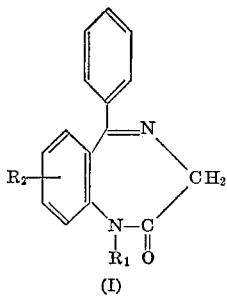

wherein $R_1$ is a cycloalkylmethyl having 4 to 7 carbon atoms and $R_2$ is hydrogen or a halogen, which comprises reacting alkaline metal salts of indole derivatives represented by the formula,

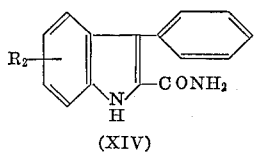

wherein $R_2$ has the same meaning as defined above, with a cycloalkylmethylating agent to yield indole derivatives represented by the formula,

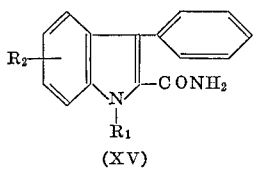

wherein $R_1$ and $R_2$ respectively have the same meaning as defined above, reducing the resultant indole derivatives of the Formula XV to yield 2-aminomethyl indole derivatives represented by the formula,

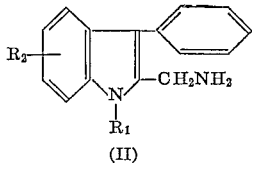

wherein $R_1$ and $R_2$ respectively have the same meanings as defined above, and reacting the resultant 2-aminomethyl indole derivatives of the Formula II or their salts with oxidizing agents to yield the benzodiazepine derivatives of the Formula I.

11. A process for preparing benzodiazepine derivatives represented by the formula,

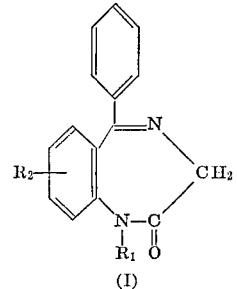

wherein $R_1$ is a cycloalkylmethyl having 4 to 7 carbon atoms and $R_2$ is hydrogen or a halogen, which comprises cycloalkylmethylating indole-2-carbonitrile derivatives represented by the formula,

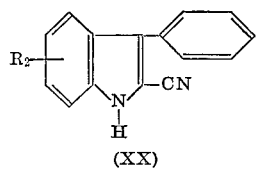

wherein $R_2$ has the same meanings as defined above, to yield indole-2-carbonitrile derivatives represented by the formula,

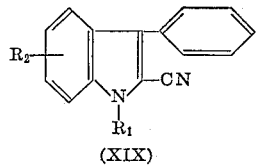

wherein $R_1$ and $R_2$ respectively have the same meanings as defined above, reducing the resultant indole-2-carbonitrile derivatives of the Formula XIX to yield 2-aminomethyl indole derivatives represented by the formula,

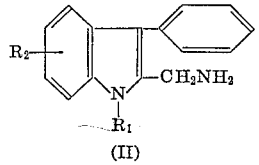

wherein $R_1$ and $R_2$ respectively have the same meanings as defined above, and then reacting the resultant 2-aminomethyl indole derivatives of the Formula II or their salts with oxidizing agents to yield the benzodiazepine derivatives of the Formula I.

12. A process for preparing benzodiazepine derivatives represented by the formula,

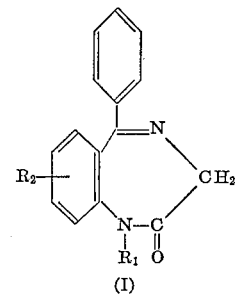

wherein $R_1$ is a cycloalkylmethyl having 4 to 7 carbon atoms and $R_2$ is hydrogen or a halogen, which comprises reacting alkaline metal salts of indole derivatives represented by the formula,

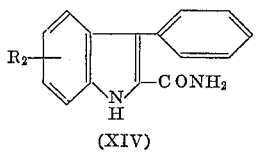

wherein $R_2$ is hydrogen or a halogen, with cycloalkylmethylating agents to yield indole derivatives represented by the formula,

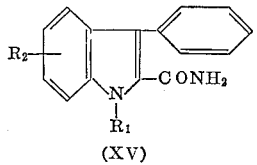

wherein $R_1$ and $R_2$ have the same meanings as defined above, heating the resultant indole derivatives of the Formula XV to yield indole-2-carbonitrile derivatives represented by the formula,

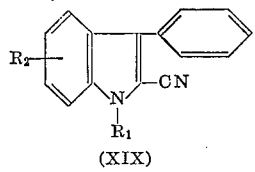

(XIX)

wherein $R_1$ and $R_2$ respectively have the same meanings as defined above, reducing the resultant indole-2-carbonitrile derivatives of the Formula XIX to 2-aminomethyl indole derivatives represented by the formula,

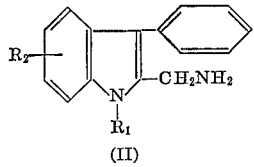

(II)

wherein $R_1$ and $R_2$ respectively have the same meanings as defined above, and then reacting the resultant 2-aminomethyl indole derivatives (II) or their salts with oxidizing agents to yield the benzodiazepine derivatives of the Formula I.

13. A process for preparing benzodiazepine derivatives represented by the formula,

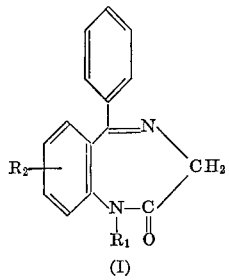

(I)

wherein $R_1$ is a cycloalkylmethyl having 4 to 7 carbon atoms and $R_2$ is hydrogen or a halogen, which comprises, converting 1-cycloalkylmethylindole - 2 - carboxylic acid ester derivatives represented by the formula,

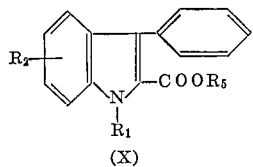

(X)

wherein $R_1$ and $R_2$ have the same meanings as defined above and $R_5$ is an alkyl having 1 to 4 carbon atoms or benzyl, to indole-2-carboxylic acid derivatives represented by the formula,

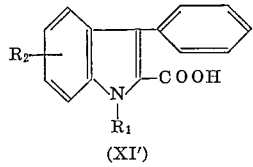

(XI')

wherein $R_1$ and $R_2$ respectively have the same meanings as defined above, reacting the resultant indole-2-carboxylic acid derivatives of the Formula XI' or their reactive derivatives with ammonia or hydroxylamine and further, if necessary, reacting the resulting compounds with phosphorous pentasulfide to yield indole-2-carboxylic acid derivatives represented by the formula,

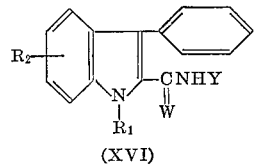

(XVI)

wherein $R_1$ and $R_2$ respectively have the same meanings as defined above, Y is hydrogen atom or hydroxyl and W is oxygen or sulfur atom, reducing the resultant indole-2-carboxylic acid derivatives of the Formula XVI to yield 2-aminomethyl indole derivatives represented by the formula,

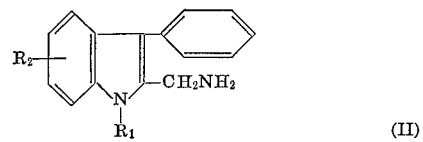

(II)

wherein $R_1$ and $R_2$ respectively have the same meanings as defined above, and then reacting the resultant 2-aminomethyl indole derivatives of the Formula II or their salts with oxidizing agents to yield the benzodiazepine derivatives of the Formula I.

14. A process for preparing benzodiazepine derivatives represented by the formula,

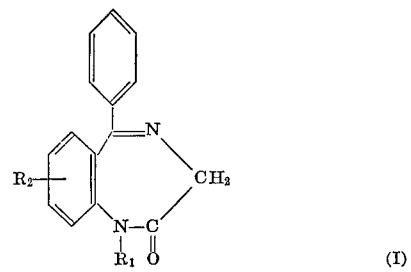

(I)

wherein $R_1$ is a cycloalkylmethyl having 4 to 7 carbon atoms, and $R_2$ is hydrogen or a halogen, which comprises converting 1-cycloalkylmethylindole - 2 - carboxylic acid ester derivatives represented by the formula,

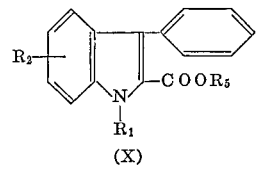

(X)

wherein $R_1$ and $R_2$ have the same meanings as defined above, $R_5$ is an alkyl having 1 to 4 carbon atoms or benzyl to indole-2-carboxylic acid derivatives represented by the formula,

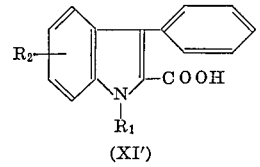

(XI')

wherein $R_1$ and $R_2$ have the same meanings as defined above, reacting the resultant indole-2-carboxylic acid derivatives of the Formula XI' with halogenating agents to yield indole-2-carboxylic halides represented by the formula,

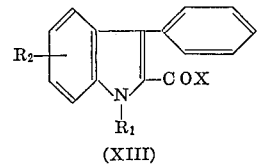

(XIII)

wherein $R_1$ and $R_2$ respectively have the same meanings as defined above and X is a halogen, reacting the resultant indole carboxylic halides with ammonia to yield indole- 2-carboxylic acid amide derivatives represented by the formula,

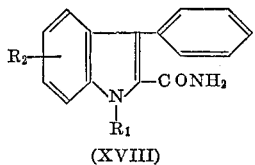

(XVIII)

wherein $R_1$ and $R_2$ respectively have the same meanings as defined above, reducing the resultant indole-2-carboxylic acid amides of the Formula XVIII to yield 2-aminomethyl indole derivatives represented by the formula,

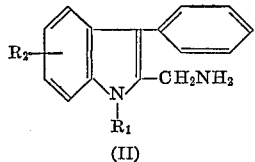

(II)

wherein $R_1$ and $R_2$ respectively have the same meanings as defined above, and then reacting the resultant 2-aminomethyl indole derivatives of the Formula II or their salts with oxidizing agents to yield the benzodiazepine derivatives of the Formula I.

15. A process for producing benzodiazepine derivatives represented by the formula,

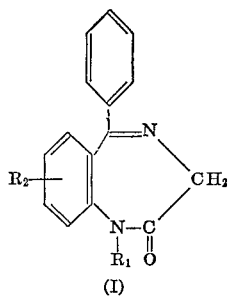

(I)

wherein $R_1$ is a cycloalkylmethyl having 4 to 7 carbon atoms and $R_2$ is hydrogen or a halogen, which comprises reacting indole-2-carboxylic acid ester derivatives represented by the formula,

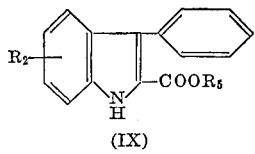

(IX)

wherein $R_2$ has the same meanings as defined above and $R_5$ is an alkyl having 1 to 4 carbon atoms or benzyl, in the presence of alkaline condensing agents, if necessary, or alkaline metal salts thereof with alkylating agents to yield N-alkylindole-2-carboxylic acid ester derivatives represented by the formula

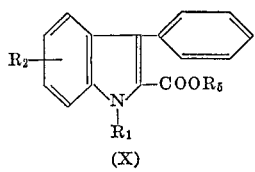

(X)

wherein $R_1$, $R_2$ and $R_5$ respectively have the same meanings as defined above, converting the resultant 1-cycloalkylmethyl-2-carboxylic acid ester derivatives of the Formula X to indole-2-carboxylic acid derivatives represented by the formula,

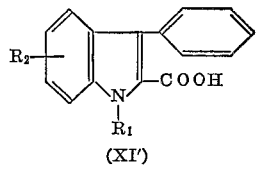

(XI')

wherein $R_1$ and $R_2$ respectively have the same meanings as defined above, reacting the resultant indole-2-carboxylic acid derivatives of the Formula XI' or their reactive derivatives with ammonia to yield indole derivatives represented by the formula,

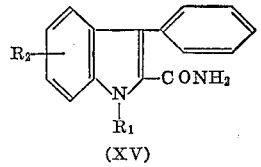

(XV)

wherein $R_1$ and $R_2$ respectively have the same meanings as defined above, reducing the resultant indole derivatives of the Formula XV to 2-aminomethyl indole derivatives represented by the formula,

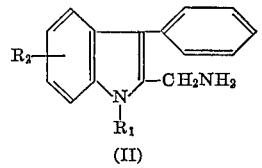

(II)

wherein $R_1$ and $R_2$ respectively have the same meanings as defined above, and then reacting the resultant 2-aminomethyl indole derivatives of the Formula II or their salts with oxidizing agents to yield the benzodiazepine derivatives of the Formula I.

16. A process for preparing benzodazepine derivatives represented by the formula,

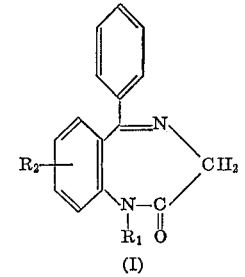

(I)

wherein $R_1$ is a cycloalkylmethyl having 4 to 7 carbon atoms and $R_2$ is hydrogen or a halogen, which comprises reacting indole-2-carboxylic acid ester derivatives represented by the formula,

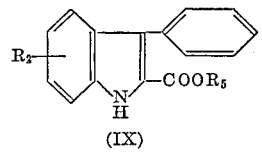

(IX)

wherein $R_2$ has the same meanings and defined above and $R_5$ is an alkyl having 1 to 4 carbon atoms or benzyl, with cycloalkylmethylating agents to yield 1-cycloalkylmethyl-indole-2-carboxylic acid ester derivatives represented by the formula,

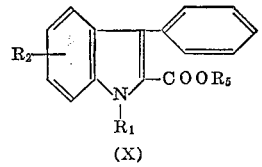

(X)

wherein $R_1$, $R_2$ and $R_5$ respectively have the same meaning as defined above, converting the resultant N-alkylindole-2-carboxylic acid ester derivatives of the Formula X to indole-2-carboxylic acid derivatives represented by the formula,

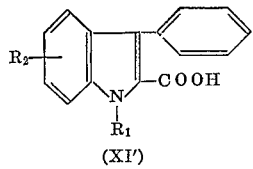

(XI′)

wherein $R_1$ and $R_2$ respectively have the same meanings as defined above, reacting the resultant indole-2-carboxylic acid derivatives of the Formula XI′ or their reactive derivatives with ammonia to yield indole derivatives represented by the formula,

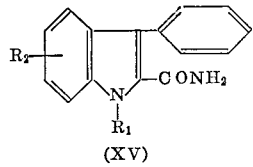

(XV)

wherein $R_1$ and $R_2$ respectively have the same meanings as defined above, dehydrating the resultant indole derivatives of the Formula XV to yield indole-2-carbonitrile derivatives represented by the formula,

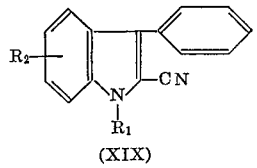

(XIX)

wherein $R_1$ and $R_2$ respectively have the same meanings as defined above, reducing the resultant indole-2-carbonitrile derivatives of the Formula XIX to yield 2-aminomethyl indole derivatives represented by the formula,

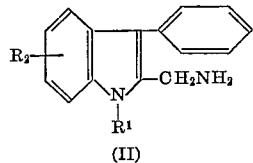

(II)

wherein $R_1$ and $R_2$ respectively have the same meanings as defined above, and then reacting the resultant 2-aminomethyl indole derivatives of the Formula II or their salts with oxidizing agent to yield the benzodiazepine derivatives of the Formula I.

17. A process for producing benzodiazepine derivatives represented by the formula,

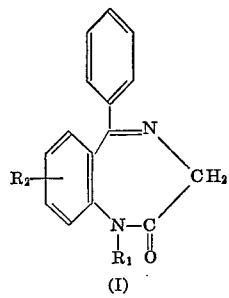

(I)

wherein $R_1$ is a cycloalkylmethyl having 4 to 7 carbon atoms, and $R_2$ is hydrogen or a halogen, which comprises reacting phenylpyruvic acid derivatives represented by the formula,

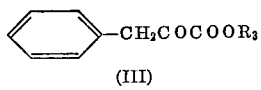

(III)

wherein $R_3$ is hydrogen, an alkyl having 1 to 4 carbon atoms or benzyl, with phenylhydrazine derivatives represented by the formula,

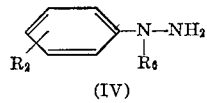

(IV)

wherein $R_2$ has the same meanings as defined above and $R_6$ is hydrogen or $R_1$, to yield indole-2-carboxylic acid derivatives represented by the formula,

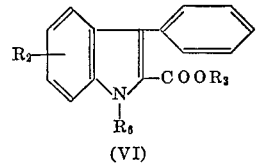

(VI)

wherein $R_2$, $R_3$ and $R_6$ respectively have the same meanings as defined above, reacting the resultant indole-2-carboxylic acid derivative of the Formula VI or their reactive derivatives with ammonia or hydroxylamine, and, if desired, reacting a reaction product with phosphorous pentasulfide and further, if $R_6$ is hydrogen, cycloalkylmethylating the resultant product to yield indole-2-carboxylic acid derivatives represented by the formula,

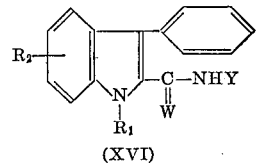

(XVI)

wherein $R_1$ and $R_2$ respectively have the same meanings as defined above, W is oxygen or sulfur and Y is hydrogen or hydroxyl, reducing the resultant indole-2-carboxylic acid derivatives of the Formula XVI to yield 2-aminomethyl indole derivatives represented by the formula,

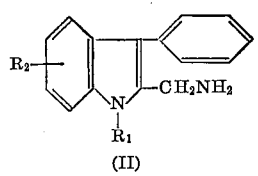

(II)

wherein $R_1$ and $R_2$ respectively have the same meanings as defined above, and then reacting the resultant 2-aminomethyl indole derivatives of the Formula II or their salts with oxidizing agents to yield the benzodiazepine derivatives of the Formula I.

18. A process for preparing benzodiazepine derivatives represented by the formula,

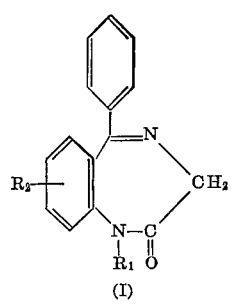

(I)

wherein $R_1$ is a cycloalkylmethyl having 4 to 7 carbon atoms and $R_2$ is hydrogen atom or halogen atom, which comprises reacting phenylpyruvic acid derivatives represented by the formula,

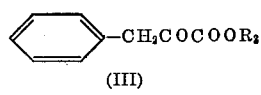

(III)

wherein $R_3$ is hydrogen, an alkyl having 1 to 4 carbon atoms or benzyl, with phenylhydrazine derivatives represented by the formula,

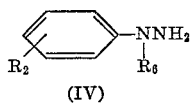

(IV)

wherein $R_2$ has the same meanings as defined above and $R_6$ is a hydrogen atom or $R_1$, to yield phenylhydrazone derivatives represented by the formula,

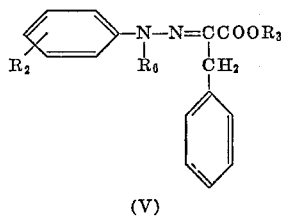

(V)

wherein $R_2$, $R_3$ and $R_6$ respectively have the same meanings as defined above, treating the resultant phenylhydrazone derivatives of the Formula V in the presence of an acid to yield indole-2-carboxylic acid derivatives represented by the formula,

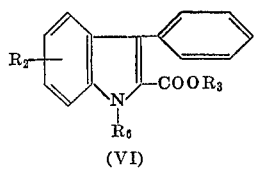

(VI)

wherein $R_2$, $R_3$ and $R_6$ respectively have the same meanings as defined above, reacting the resultant indole-2-carboxylic acid derivatives of the Formula VI or their reactive derivatives with ammonia or hydroxylamine, and if necessary, reacting a reaction product with phosphorous pentasulfide and further, if $R_6$ is hydrogen, cycloalkylmethylating the resultant product to yield indole-2-carboxylic acid derivatives represented by the formula,

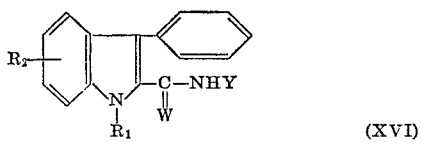

(XVI)

wherein $R_1$ and $R_2$ respectively have the same meanings as defined above, W is oxygen or sulfur and Y is hydrogen or hydroxyl, reducing the resultant indole-2-carboxylic acid derivatives of the Formula XVI to yield 2-aminomethyl indole derivatives represented by the formula,

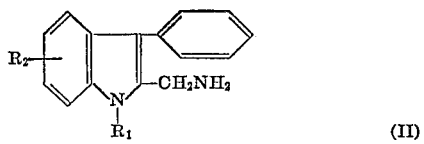

(II)

wherein $R_1$ and $R_2$ respectively have the same meanings as defined above, and then reacting the resultant 2-aminomethyl indole derivatives of the Formula II or their salts with oxidizing agents to yield the benzodiazepine derivatives of the Formula I.

19. A process for producing benzodiazepine derivatives represented by the formula,

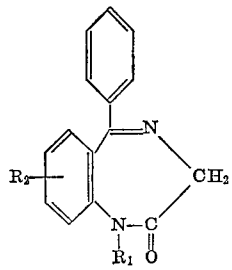

(I)

wherein $R_1$ is a cycloalkylmethyl having 4 to 7 carbon atoms and $R_2$ is hydrogen or a halogen, which comprises reacting β-keto acid ester derivatives represented by the formula,

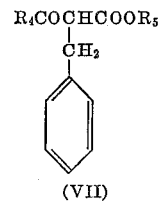

(VII)

wherein $R_4$ is an alkyl having 1 to 4 carbon atoms and $R_5$ is an alkyl 1 to 4 carbon atoms or benzyl, with benzene diazonium salts represented by the formula,

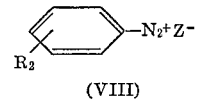

(VIII)

wherein $R_2$ has the same meanings as defined above and Z is a halogen, to yield phenylhydrazone derivatives represented by the formula,

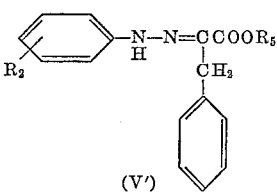

(V')

wherein $R_2$ and $R_5$ respectively have the same meanings as defined above, treating the resultant phenylhydrazone derivatives of the Formula V' in the presence of an acid to yield indole-2-carboxylic acid ester derivatives represented by the formula,

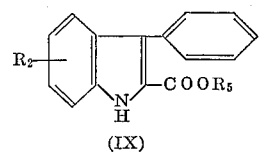

(IX)

wherein $R_2$ and $R_5$ respectively have the same meanings as defined above, reacting the resultant indole-2-carboxlic acid ester derivatives of the Formula IX with cycloalkylmethylating agents to yield 1-cycloalkylmethyl-indole-2-carboxylic acid ester derivatives represented by the formula,

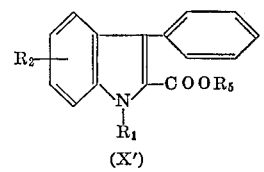

(X')

wherein $R_1$, $R_2$ and $R_5$ respectively have the same meanings as defined above, converting the resultant 1-cycloalkylmethylindole-2-carboxylic acid ester derivatives of the Formula X' to indole-2-carboxylic acid derivatives represented by the formula,

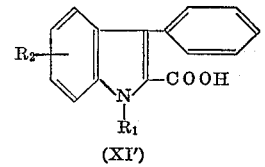

(XI')

wherein $R_1$ and $R_2$ respectively have the same meanings as defined above, reacting the resultant indole-2-carboxylic acid derivatives of the Formula XI' or their reactive derivative with ammonia or hydroxylamine and further, if necessary, reacting the resulting compounds with phosphorous pentasulfide to yield indole-2-carboxylic acid derivatives represented by the formula,

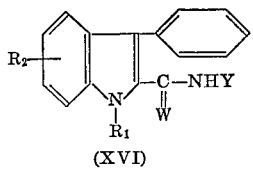

(XVI)

wherein $R_1$ and $R_2$ respectively have the same meanings as defined above, W is oxygen or sulfur and Y is hydrogen or hydroxyl, reducing the resultant indole-2-carboxylic acid derivatives to 2-aminomethyl indole derivatives represented by the formula,

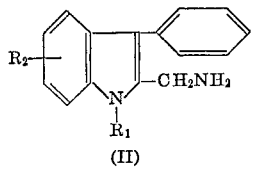

(II)

wherein $R_1$ and $R_2$ respectively have the same meanings as defined above, and then reacting the resultant 2-aminomethyl indole derivatives of the Formula II or their salts with appropriate oxidizing agents to yield the benzodiazepine derivatives of the Formula I.

20. A process for preparing benzodiazepine derivatives represented by the formula,

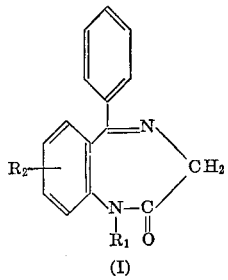

(I)

wherein $R_1$ is a cycloalkylmethyl having 4 to 7 carbon atoms and $R_2$ is hydrogen or a halogen which comprises reacting β-keto acid ester derivatives represented by the formula, $$R_4COCHCOOR_5$$
$$\overset{|}{C}H_2$$
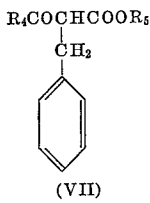

(VII)

wherein $R_4$ is an alkyl having 1 to 4 carbon atoms and $R_5$ is an alkyl 1 to 4 carbon atoms or benzyl, with benzene diazonium salts represented by the formula,

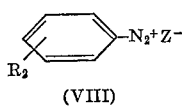

(VIII)

wherein $R_2$ has the same meanings as defined above, to yield azo derivatives represented by the formula,

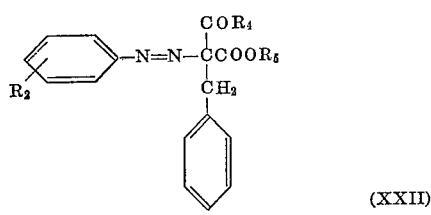

(XXII)

wherein $R_2$, $R_4$ and $R_5$ respectively have the same meanings as defined above, treating the resultant azo derivatives of the Formula XXII in the presence of an acid to yield indole-2-carboxylic acid ester derivatives represented by the formula,

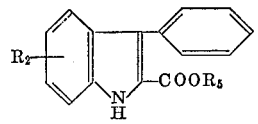

(IX)

wherein $R_2$ and $R_5$ respectively have the same meanings as defined above, reacting the resultant indole-2-carboxylic acid ester derivatives of the Formula IX with cycloalkylmethylating agents to yield 1-cycloalkylmethylindole-2-carboxylic acid ester derivatives represented by the formula,

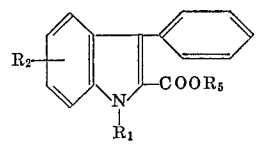

(X)

wherein $R_1$, $R_2$ and $R_5$ respectively have the same meanings as defined above, converting the resultant 1-cycloalkylmethylindole-2-carboxylic acid ester derivatives of the Formula X) to indole 2-carboxylic acid derivatives represented by the formula

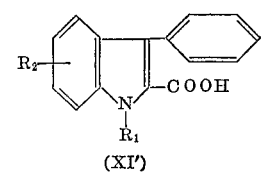

(XI')

wherein $R_1$ and $R_2$ respectively have the same meanings as defined above, reacting the resultant indole-2-carboxylic acid derivatives of the Formula XI' or their reactive derivatives with ammonia or hydroxylamine and further, if necessary, reacting the resulting compounds with phosphorous pentasulfide to yield indole-2-carboxylic acid derivatives represented by the formula,

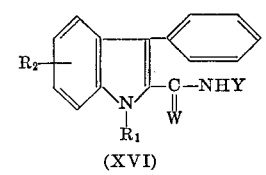

(XVI)

wherein $R_1$ and $R_2$ respectively have the same meanings as defined above, W is oxygen or sulfur atom and Y is hydrogen atom or hydroxyl group, reducing the resultant indole-2-carboxylic acid derivatives of the formula to yield 2-aminomethyl-indole derivatives represented by the formula,

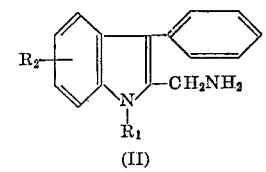

(II)

wherein $R_1$ and $R_2$ respectively have the same meanings as defined above, and then reacting the resultant 2-aminomethyl indole derivatives of the Formula II or their salts with appropriate oxidizing agents to yield the benzodiazepine derivatives of the Formula I.

21. A process for preparing acid addition salts of benzodiazepines represented by the formula

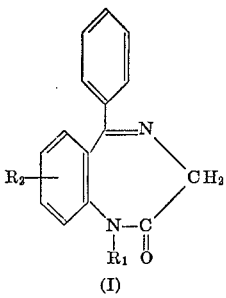

(I)

wherein $R_1$ is a cycloalkylmethly having 4 to 7 carbon atoms and $R_2$ is hydrogen or a halogen, which comprises reacting 2-aminomethyl indoles represented by the formula,

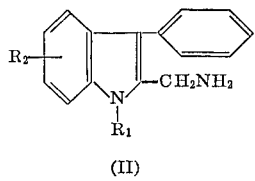

(II)

wherein $R_1$ and $R_2$ respectively have the same meanings as defined above, or their acid addition salts with at least the stoichiometric amount of an oxidizing agent selected from the group consisting of ozone, peracids, chromic acid and potassium permanganate, and to yield the benzodiazepines of the Formula I and reacting the benzodiazepines of the Formula I with a mineral or organic acid to yield said acid addition salts.

22. Process according to claim 21 wherein said peracids are selected from the group consisting of performic, peracetic and perbenzoic.

23. Process according to claim 21 wherein said acid addition salts are hyrochloric, sulfuric, nitric, phosphoric, maleic, fumaric, succinic, formic or acetic acid addition salts.

24. Process according to claim 21 wherein said oxidizing acid is chromic acid.

25. Process according to claim 24 wherein said oxidation is carried out using said chromic acid in the presence of acetic acid and said chromic acid is used in an amount at least 2 to 3 times the stoichiometric amount required.

References Cited

Elderfield: "Heterocyclic Compounds," vol. 3, pp. 8–13 (Wiley) (1952).

Noller: "Chemistry of Organic Compounds," 2nd ed., pp. 250, 254 (Saunders) (1957).

Chemical Abstracts, vol. 52 (1958), cols. 11039–11040 abstracting Nogradi "Monatsh. Chem." vol. 88, pp. 1087–94 (1958).

ROBERT T. BOND, Primary Examiner

U.S. Cl. X.R.

260—999, 326.15, 326.12 R, 326.13 R, 569, 141